(12) United States Patent
Hisano

(10) Patent No.: US 10,798,347 B2
(45) Date of Patent: Oct. 6, 2020

(54) INFORMATION PROCESSING DEVICE, INFORMATION PROCESSING METHOD, AND PROGRAM

(71) Applicant: SONY CORPORATION, Tokyo (JP)

(72) Inventor: Keisuke Hisano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/309,779

(22) PCT Filed: May 26, 2017

(86) PCT No.: PCT/JP2017/019718
§ 371 (c)(1),
(2) Date: Dec. 13, 2018

(87) PCT Pub. No.: WO2018/025474
PCT Pub. Date: Feb. 8, 2018

(65) Prior Publication Data
US 2019/0335146 A1   Oct. 31, 2019

(30) Foreign Application Priority Data

Aug. 3, 2016 (JP) .................. 2016-152595

(51) Int. Cl.
*G06T 5/00* (2006.01)
*H04N 9/31* (2006.01)
(Continued)

(52) U.S. Cl.
CPC .......... *H04N 9/3135* (2013.01); *G06T 5/009* (2013.01); *G06T 2207/20208* (2013.01)

(58) Field of Classification Search
CPC combination set(s) only.
See application file for complete search history.

(56) References Cited

U.S. PATENT DOCUMENTS

2003/0006985 A1    1/2003  David et al.
2009/0324135 A1*  12/2009  Kondo .................. G06T 3/4038
                                                                            382/284
(Continued)

FOREIGN PATENT DOCUMENTS

JP          7-13497 A     1/1995
JP       2003-125317 A    4/2003
(Continued)

OTHER PUBLICATIONS

International Search Report dated Aug. 22, 2017 in PCT/JP2017/019718 filed May 26, 2017.
(Continued)

*Primary Examiner* — Wesner Sajous
(74) *Attorney, Agent, or Firm* — Oblon, McClelland, Maier & Neustadt, L.L.P.

(57) ABSTRACT

According to an embodiment of the present technology, there is provided an information processing device including an input unit, a setting unit, and a generation unit. An image information item of an image to be a projection target is input to the input unit. The setting unit sets a superimposition region at a predetermined position in the image to be the projection target. The generation unit generates, on the basis of the input image-information item, a base image that contains an image of the set superimposition region, and a superimposition image that is superimposed onto the image of the superimposition region in the base image.

17 Claims, 12 Drawing Sheets

(51) Int. Cl.
    *H04N 5/74*     (2006.01)
    *G09G 5/10*     (2006.01)
    *G03B 21/20*     (2006.01)
    *G03B 21/26*     (2006.01)
    *G03B 37/04*     (2006.01)

(56) References Cited

U.S. PATENT DOCUMENTS

| | | |
|---|---|---|
| 2013/0093805 A1 | 4/2013 | Iverson |
| 2014/0043352 A1 | 2/2014 | Damberg et al. |
| 2016/0292835 A1* | 10/2016 | Shibata ................ H04N 1/4072 |
| 2016/0292836 A1* | 10/2016 | Perry ................ G06F 3/04845 |
| 2017/0310943 A1* | 10/2017 | Borchert .............. H04N 13/239 |
| 2018/0278985 A1* | 9/2018 | De Haan .......... H04N 21/42653 |

FOREIGN PATENT DOCUMENTS

| | | |
|---|---|---|
| JP | 2003-524962 A | 8/2003 |
| JP | 2008-20822 A | 1/2008 |
| JP | 2011-2666 A | 1/2011 |
| JP | 2011-13310 A | 1/2011 |
| JP | 2013-536601 A | 9/2013 |
| JP | 2014-517337 A | 7/2014 |
| WO | WO 2015/172236 A1 | 11/2015 |

OTHER PUBLICATIONS

Extended European Search Report dated Jul. 4, 2019 in European Patent Application No. 17836581.3, 39 pages.

\* cited by examiner

INFORMATION PROCESSING DEVICE, INFORMATION PROCESSING METHOD, AND PROGRAM

TECHNICAL FIELD

The present technology relates to an information processing device, an information processing method, and a program that are capable of controlling image representation by a plurality of projectors.

BACKGROUND ART

Hitherto, projection-type display devices that use a plurality of light sources and projectors together have been devised. An intensity of light beams to be projected and displayed can be increased by superimposing the light beams on each other. For example, Patent Literature 1 discloses a highlight projector system that increases a peak luminance of an image to be projected and displayed. Among pixels contained in a data item of the image, pixels each having a luminance value exceeding a first threshold are detected, and a region formed by linking these pixels to each other is specified as a highlight region. Luminances of all the pixels in the highlight region are increased with use of scanning beams such as a laser beam (paragraphs [0025] and [0044] of the specification of Patent Literature 1).

CITATION LIST

Patent Literature

Patent Literature 1: Japanese Translation of PCT International Application No. 2014-517337

DISCLOSURE OF INVENTION

Technical Problem

Also in the future, the system for projecting high-luminance images with use of a plurality of light sources and projectors will probably continue to prevail. Technologies for efficiently superimposing a plurality of images on each other such that high-quality images can be displayed have been demanded.

Under such circumstances, the present technology has been made to achieve an object to provide an information processing device, an information processing method, and a program that enable representation of high-quality images with use of a plurality of image projection devices.

Solution to Problem

In order to achieve the above-mentioned object, according to an embodiment of the present technology, there is provided an information processing device including an input unit, a setting unit, and a generation unit.

An image information item of an image to be a projection target is input to the input unit.

The setting unit sets a superimposition region at a predetermined position in the image to be the projection target.

The generation unit generates, on the basis of the input image-information item,
  a base image that contains an image of the set superimposition region, and
  a superimposition image that is superimposed onto the image of the superimposition region in the base image.

In this information processing device, the superimposition region is set at the predetermined position in the image to be the projection target by the setting unit. The base image that contains the image of the superimposition region, and the superimposition image that is superimposed onto the image of the superimposition region are generated on the basis of the input image-information item by the generation unit. With this, the representation of high-quality images with use of a plurality of image projection devices can be performed.

The generation unit may execute
  a highlighting process on a part of the input image-information item, the part corresponding to the superimposition region, and
  a standard representation process on another part of the input image-information item, the other part corresponding to another region, to generate the base image and the superimposition image.

With this, quality of the image of the superimposition region can be selectively increased. As a result, the representation of high-quality images with use of a plurality of image projection devices can be performed.

The highlighting process may be a process of calculating a display luminance of each pixel to be contained in the superimposition region.

In this case, the generation unit may generate both the image of the superimposition region and the superimposition image on the basis of the calculated display luminance of each of the pixels.

With this, the images can be displayed with desired display luminances, and hence quality of these images can be increased.

The image of the superimposition region may contain a pixel information item of each pixel of the image of the superimposition region, and the superimposition image may contain a pixel information item of each pixel of the superimposition image.

In this case, the generation unit may compare the calculated display luminance of each of the pixels and a predetermined reference luminance to each other to generate both
  a base-pixel information item being the pixel information item of corresponding one of the pixels of the image of the superimposition region, and
  a superimposition-pixel information item being the pixel information item of corresponding one of the pixels of the superimposition image.

With this, the representation of the images with desired display luminances can be easily performed, and hence high-quality images can be displayed.

When the calculated display luminance is lower than the predetermined reference luminance, the generation unit may generate, with respect to corresponding one of the pixels to be contained in the superimposition region,
  a pixel information item corresponding to the calculated display luminance as the base-pixel information item, and
  a pixel information item corresponding to a display luminance of zero as the superimposition-pixel information item.

With this, high quality of images of regions with low display luminances can be achieved.

When the calculated display luminance is higher than the predetermined reference luminance, the generation unit may generate, with respect to corresponding one of the pixels to be contained in the superimposition region,
  a pixel information item corresponding to the predetermined reference luminance as the base-pixel information item, and a pixel information item corresponding to a difference between the calculated display luminance and the predetermined reference luminance as the superimposition-pixel information item.

With this, the images can be displayed with the display luminances in an expanded luminance range, and hence high image quality can be achieved.

The generation unit may generate, respectively on the basis of a first reference luminance and a second reference luminance that is higher than the first reference luminance, a first superimposition image and a second superimposition image that are superimposed on the image of the superimposition region.

With this, the luminance range of the display luminances can be sufficiently expanded, and hence significantly high image quality can be achieved.

The first superimposition image may contain first-superimposition-pixel information items each being a pixel information item of corresponding one of pixels of the first superimposition image, and the second superimposition image may contain second-superimposition-pixel information items each being a pixel information item of corresponding one of pixels of the second superimposition image.

In this case, when the calculated display luminance is lower than the first reference luminance, the generation unit may generate, with respect to corresponding one of the pixels to be contained in the superimposition region, the pixel information item corresponding to the calculated display luminance as the base-pixel information item, and the pixel information items each corresponding to the display luminance of zero as corresponding one of the first-superimposition-pixel information items and corresponding one of the second-superimposition-pixel information items.

With this, high quality of images of regions with low display luminances can be achieved.

When the calculated display luminance is higher than the first reference luminance and lower than the second reference luminance, the generation unit may generate, with respect to corresponding one of the pixels to be contained in the superimposition region, a pixel information item corresponding to the first reference luminance as the base-pixel information item, a pixel information item corresponding to a difference between the calculated display luminance and the first reference luminance as corresponding one of the first-superimposition-pixel information items, and the pixel information item corresponding to the display luminance of zero as corresponding one of the second-superimposition-pixel information items.

With this, the images can be displayed with the display luminances in an expanded luminance range, and hence high image quality can be achieved.

When the calculated display luminance is higher than the second reference luminance, the generation unit may generate, with respect to corresponding one of the pixels to be contained in the superimposition region, the pixel information item corresponding to the first reference luminance as the base-pixel information item, a pixel information item corresponding to a difference between the second reference luminance and the first reference luminance as corresponding one of the first-superimposition-pixel information items, and a pixel information item corresponding to a difference between the calculated display luminance and the second reference luminance as corresponding one of the second-superimposition-pixel information items.

With this, image representation in a luminance range that is sufficiently expanded by superimposition of three or more images can be performed. As a result, significantly high image quality can be achieved.

The predetermined reference luminance may be set on the basis of at least one of a peak luminance of the image to be the projection target, a luminance that can be exhibited by an image projection device that projects the base image, or a luminance that can be exhibited by an image projection device that projects the superimposition image.

With this, the images can be superimposed on each other with high accuracy, and hence high-quality images can be displayed.

The highlighting process may be a process of calculating a display luminance in a high dynamic range of each of the pixels to be contained in the superimposition region.

With this, images in the high dynamic range (HDR) can be displayed, and hence the images can be clearly displayed with less blown-out highlights and blocked-up shadows.

The standard representation process may be a process of calculating a display luminance of each pixel to be contained in the other region.

In this case, the generation unit may generate the base image on the basis of the calculated display luminance of each of the pixels to be contained in the other region.

With this, an image containing the superimposition region and the other region can be generated with high accuracy. As a result, image quality can be increased.

The standard representation process may be a process of calculating a display luminance in a standard dynamic range of each of the pixels to be contained in the other region.

With this, images in the standard dynamic range (SDR) can be displayed. As a result, representation of high-quality images can be performed efficiently with a smaller number of necessary image-projection devices.

The generation unit may execute an enlargement process of enlarging the superimposition image in accordance with a resolution of the image projection device that projects the superimposition image.

With this, the superimposition image can be displayed with use of, for example, an entirety of a display range of the image projection device. As a result, the representation of high-quality images with use of a plurality of image projection devices can be efficiently performed.

An image information item of an image in the high dynamic range may be input to the input unit.

With this, HDR images in expressive gradations can be displayed. As a result, the representation of high-quality images with use of a plurality of image projection devices can be performed.

An image information item of an image containing a plurality of display regions may be input to the input unit.

In this case, the setting unit may set at least one of the plurality of display regions as the superimposition region.

With this, on the basis of the single image-information item, a screen layout containing the plurality of display regions different from each other in image quality can be realized.

According to another embodiment of the present technology, there is provided an information processing method that is carried out by a computer system. The information processing method includes:

acquiring an image information item of an image to be a projection target;

setting a superimposition region at a predetermined position in the image to be the projection target; and generating, on the basis of the acquired image-information item, a base image that contains an image of the set superimposition region, and a superimposition image that is superimposed onto the image of the superimposition region in the base image.

According to still another embodiment of the present technology, there is provided a program for causing a computer system to perform the steps of:

acquiring an image information item of an image to be a projection target;

setting a superimposition region at a predetermined position in the image to be the projection target; and generating, on the basis of the acquired image-information item, a base image that contains an image of the set superimposition region, and a superimposition image that is superimposed onto the image of the superimposition region in the base image.

Advantageous Effects of Invention

As described above, according to the present technology, the representation of high-quality images with use of a plurality of image projection devices can be performed. Note that, the advantages disclosed herein are not necessarily limited to those described hereinabove, and all the advantages described hereinabove and hereinbelow can be obtained.

MODE(S) FOR CARRYING OUT THE INVENTION

Now, embodiments of the present technology are described with reference to the drawings.

First Embodiment

[Image Projection System]

Figure 1:
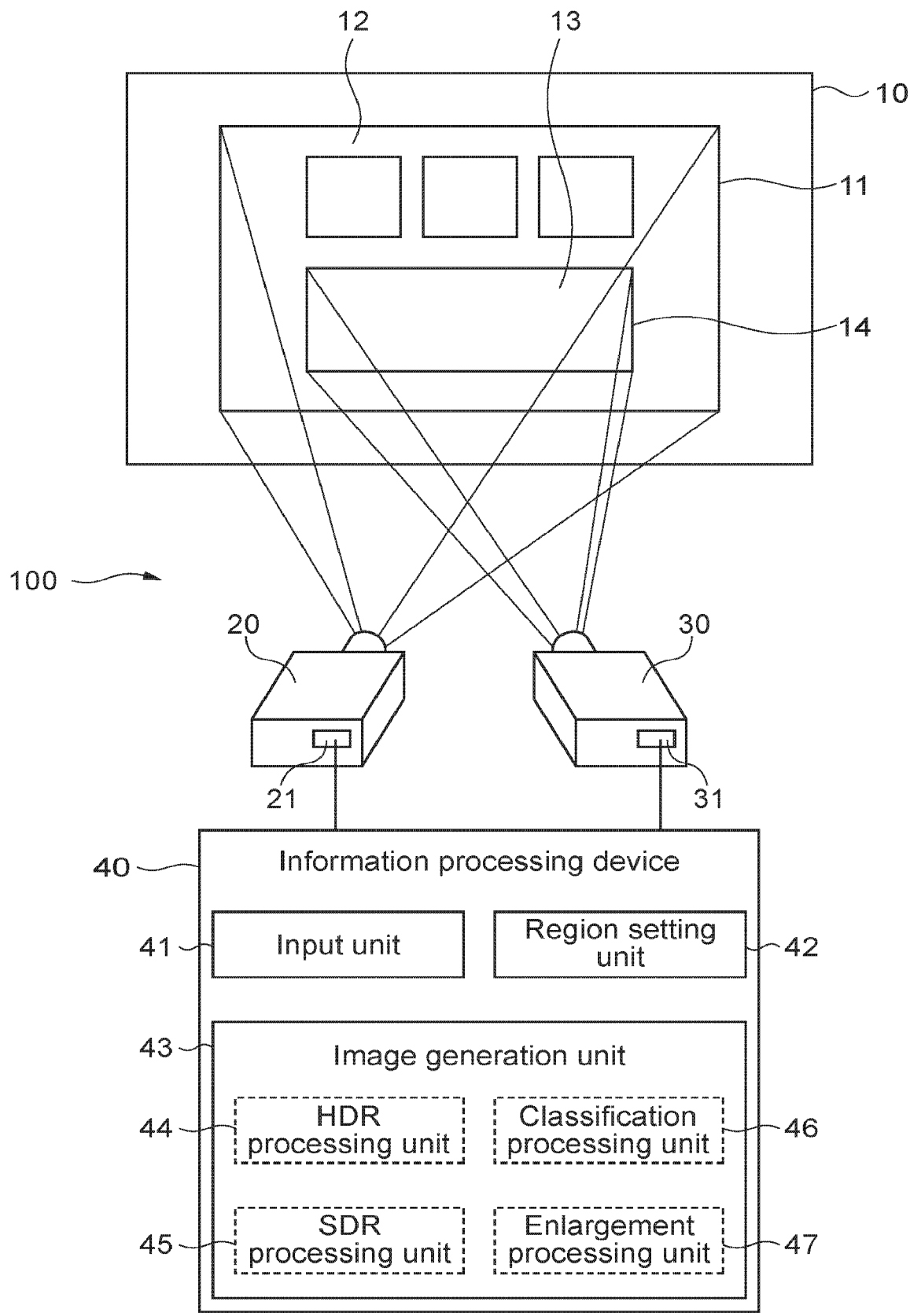
FIG. 1 A schematic diagram showing a configuration example of an image projection system according to a first embodiment.
Figure 2:
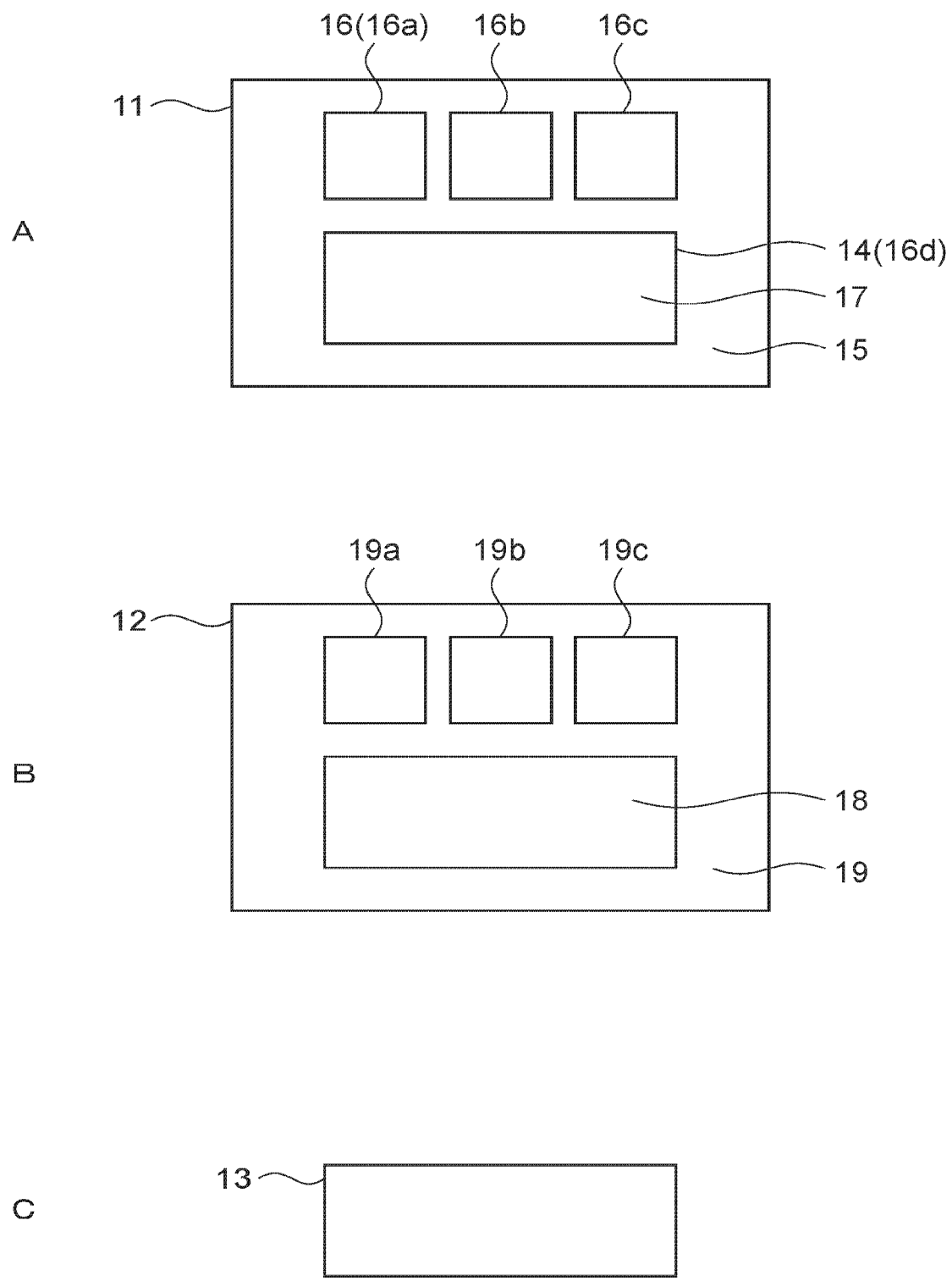
FIG. 2 Schematic diagrams showing a projection image that is projected on a screen, and a base image and a superimposition image that constitute the projection image.

FIG. 1 is a schematic diagram showing a configuration example of an image projection system according to a first embodiment of the present technology. FIG. 2 is schematic diagrams showing a projection image that is projected on a screen, and a base image and a superimposition image that constitute the projection image.

An image projection system 100 includes a screen 10, a base projector 20, a highlight projector 30, and an information processing device 40. As shown in FIG. 1 and A of FIG. 2, in this embodiment, an HDR region 14 is set at a predetermined position in a projection image 11 that is projected on the screen 10. A region other than the HDR region 14 is an SDR region 15. In this embodiment, the HDR region 14 is displayed in a high dynamic range, and the SDR region 15 is displayed in a standard dynamic range.

For example, when an image containing a plurality of display regions 16 is displayed as the projection image 11, one of these regions is set as the HDR region 14. In this embodiment, a concert video of a trio of artists, specifically, an image containing display regions 16a, 16b, and 16c that respectively display its members, and a display region 16d that displays an entirety of a stage is projected as a content item.

When, for example, the display region 16d that displays the entirety of the stage is set as the HDR region 14, the entirety of the stage is colorfully displayed in the high dynamic range. With this, realistic video experience can be provided. Note that, the high dynamic range is described in detail below.

In this embodiment, the HDR region 14 corresponds to the superimposition region. The number, a position, a shape, and the like of the HDR region 14 are not limited, and may be arbitrarily set. Hereinbelow, an image to be displayed in the HDR region 14 of the projection image 11 is referred to as a highlight image 17.

The image projection system 100 is applicable not only to the concert video or the like, but also to other fields. For example, when the projection image 11 to be projected is constituted by multiple screens that are used in live sports broadcasting, one of the screens, which is to be displayed in detail, can be set as the HDR region 14. The present technology is applicable to other arbitrary fields such as digital cinema and telemedicine.

The base projector 20 shown in FIG. 1 projects a base image 12 onto the screen 10. As shown in B of FIG. 2, the base image 12 contains an HDR-region image 18 being an image that is projected into the HDR region 14, an SDR-region image 19 being an image that is projected into the SDR region 15. As shown in B of FIG. 2, the SDR-region image 19 contains images of display regions 19a, 19b, and 19c that respectively display the members. It can also be said that the base image 12 is an image that defines a screen layout of the projection image 11.

The highlight projector 30 projects the superimposition image 13 onto the screen 10. As shown in C of FIG. 2, the superimposition image 13, which is an image to be projected into the HDR region 14, is superimposed onto the HDR-region image 18 in the base image 12. In other words, when the HDR-region image 18 in the base image 12, and the superimposition image 13 are superimposed on each other, the highlight image 17 in the projection image 11 is generated. With this, the HDR region 14 can be displayed with a luminance higher than that of the SDR region 15.

As shown in FIG. 1, the base projector 20 and the highlight projector 30 respectively include input interfaces 21 and 31 each provided, for example, with an HDMI (trademark) (High-Definition Multimedia Interface) terminal and a WiFi module. Via the input interfaces 21 and 31, the base projector 20, the highlight projector 30, and the information processing device 40 are connected to each other.

In this embodiment, the base projector 20 and the highlight projector 30 correspond respectively to an image projection device that projects the base image, and an image projection device that projects the superimposition image.

The information processing device 40 generates both the base image 12 that is projected by the base projector 20, and the superimposition image 13 that is projected by the highlight projector 30. The information processing device 40 includes hardware modules necessary for a configuration of a computer, such as a CPU (Central Processing Unit), a ROM (Read Only Memory), a RAM (Random Access Memory), and an HDD (Hard Disk Drive). A PC (Personal Computer), for example, is used as the information processing device 40, but other arbitrary computers may be used thereas.

When the CPU loads a stored program according to this embodiment from the ROM or the HDD into the RAM, and executes this program, functional blocks shown in FIG. 1, specifically, functions of an input unit 41, a region setting unit 42, and an image generation unit 43 are performed. In addition, an information processing method according to the present technology is carried out by these functional blocks. Note that, in order to perform the functions of the functional blocks, dedicated hardware modules such as an FPGA (Field Programmable Gate Array) and an image processing IC (Integrated Circuit) may be used as appropriate.

The program is installed in the information processing device 40 via, for example, various recording media. Alternatively, the program may be installed via, for example, the Internet.

Image information items transmitted from image sources such as a camera and a server device (not shown) are input to the input unit 41 via an input interface (not shown). The input interface for the information processing device 40 is not limited, and the HDMI terminal, the WiFi module, and the like may be used as appropriate. Alternatively, dedicated interfaces compatible with UHDTV (Ultra High Definition Television), such as a multicore multimode fiber, may be used.

The region setting unit 42 sets the HDR region 14 at the predetermined position in the projection image 11 to be projected, that is, in an image to be a projection target. Specifically, a size, the shape, and the position of the HDR region 14 are set on the basis of, for example, the screen layout of the projection image 11. An information item of the set position of the HDR region 14 is stored in a storage unit constituted, for example, by the HDD, and is referred to as appropriate. In this embodiment, the region setting unit 42 corresponds to a setting unit.

The image generation unit 43 includes, as its functional blocks, an HDR processing unit 44, an SDR processing unit 45, a classification processing unit 46, and an enlargement processing unit 47. By using these functional blocks as appropriate, the image generation unit 43 generates the base image 12 and the superimposition image 13 on the basis of the input image-information item of the projection image 11. In this embodiment, the image generation unit 43 corresponds to a generation unit.

The HDR processing unit 44 executes a process of calculating display luminances in a high dynamic range of each pixel to be contained in the highlight image 17. In this embodiment, an HDR process that is executed by the HDR processing unit 44 corresponds to a highlighting process.

The SDR processing unit 45 executes a process of calculating display luminances in a standard dynamic range of each pixel to be contained in the SDR-region image 19. In this embodiment, an SDR process that is executed by the SDR processing unit 45 corresponds to a standard representation process.

In this embodiment, the display luminances that are calculated by the HDR process and the SDR process correspond to luminance values of the pixels at a time of being displayed on the screen 10. In order that the calculated display luminances are achieved, the information processing device 40 controls both the base projector 20 and the highlight projector 30.

Specifically, by the information processing device 40, a pixel information item of each pixel of the base image 12 is generated and output to the base projector 20. Further, a pixel information item of each pixel of the superimposition image 13 is generated and output to the highlight projector 30. Note that, the pixel information items are information items for causing the base projector 20 and the highlight projector 30 to project the images. The pixel information items include video signals for causing the pixels to be displayed with desired display brightnesses on the screen.

On the basis of the pixel information items output from the information processing device 40, the base image 12 and the superimposition image 13 shown in B and C of FIG. 2 are projected in a superimposed manner by the base projector 20 and the highlight projector 30. With this, the projection image 11 shown in A of FIG. 2 is displayed with high accuracy. A method of generating the pixel information items to be output to the projectors is described in detail below.

In this embodiment, generating the images includes generating the pixel information item of each of the pixels of the images. Thus, generating and outputting the pixel information item of each of the pixels to the projectors correspond to generating and outputting, to the projectors, the images to be projected.

The display luminances in the high dynamic range, which are calculated by the HDR process, are display luminances corresponding to gradations in the high dynamic range. The display luminances in the standard dynamic range, which are calculated by the SDR process, are display luminances corresponding to gradations in the standard dynamic range. As can be understood from comparison between the gradations in the high dynamic range and the gradations in the standard dynamic range, a gradation range of the gradations in the high dynamic range is set wider than that of the gradations in the standard dynamic range.

In this embodiment, as the gradations in the standard dynamic range, gradations within a range of luminances that can be exhibited by general display devices alone are set. Thus, the display luminances in the standard dynamic range can be achieved, for example, only by the projection from the base projector 20. Meanwhile, gradations to be used as those in the high dynamic range are generated by expanding luminances of bright areas while maintaining luminances of dark areas. In this embodiment, the display luminances in the high dynamic range are achieved by causing the base projector 20 and the highlight projector 30 to superimpose the images on each other.

Note that, a specific method of setting the gradations in the high dynamic range and the gradations in the standard dynamic range is not limited, and may be set as appropriate.

Figure 3:
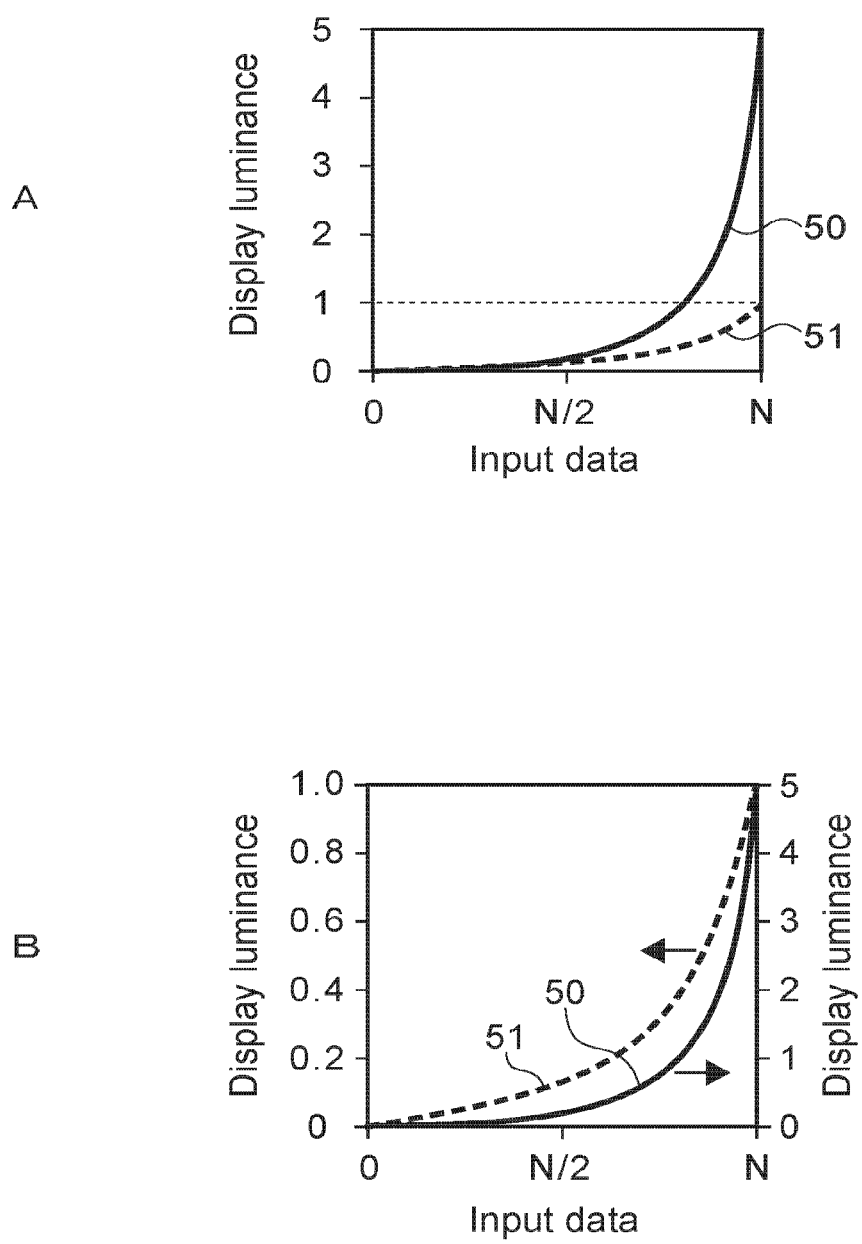
FIG. 3 Schematic graphs showing gamma curves for describing an example of gradations in a high dynamic range and gradations in a standard dynamic range.

FIG. 3 is schematic graphs showing gamma curves for describing an example of the gradations of each of the high dynamic range and the standard dynamic range according to this embodiment. The gamma curves represent parameters that are used for determining the display luminances of the pixels from the image information items input to the information processing device 40. By setting the gamma curves as appropriate, characteristics (gradation characteristics) of the display luminances can be controlled. For example, by this control, the display luminances can be roughly set in the bright region, and the display luminances can be set finely in the dark region.

A of FIG. 3 shows a gamma curve 50 of the high dynamic range (HDR), and a gamma curve 51 of the standard dynamic range (SDR). The abscissa axis of the graph represents data items each indicating the luminance of each of the pixels contained in each of the image information items input to the information processing device 40 (hereinafter, abbreviated as input data items). The ordinate axis of the graph represents the display luminances, specifically, represents relative values with respect to "1" as an upper limit of display luminances on the SDR gamma curve 51.

With respect to the input data item of each of the pixels, which is input to the information processing device 40, the SDR processing unit 45 calculates the display luminance with use of the SDR gamma curve 51. In the example shown in A of FIG. 3, the display luminances that are calculated with use of the SDR gamma curve 51 range from 0 to 1. This range corresponds to a luminance range of the gradations in the standard dynamic range. With respect to the input data items of the pixels, the display luminances in the standard dynamic range (from 0 to 1) are calculated as appropriate. When a maximum value N is calculated as the input data item of one of the pixels, the display luminance of this pixel is "1" being the upper limit value.

An upper limit of the luminance range of the gradations in the standard dynamic range, that is, the upper limit of the display luminances on the SDR gamma curve 51 is set, for example, within a range equal to or less than a maximum-possible luminance to be exhibited on the screen 10 by the base projector 20 alone. With this, the display luminances in the standard dynamic range, which are calculated by the SDR process, can be exhibited only by the projection by the base projector 20.

With respect to the input data item of each of the pixels, which is input to the information processing device 40, the HDR processing unit 44 calculates the display luminance with use of the HDR gamma curve 50. In the example shown in A of FIG. 3, the display luminances that are calculated with use of the HDR gamma curve 50 range from 0 to 5. This range corresponds to a luminance range of the gradations in the high dynamic range. In this range, the luminances of the bright areas are expanded. In other words, the luminances of the bright areas, that is, luminances on a high-luminance side are expanded up to five times as high as those can be expressed by the SDR gamma curve 51.

With respect to the input data item of the pixel, the display luminances in the high dynamic range (from 0 to 5) are calculated as appropriate. When the maximum value N is calculated as the input data item of one of the pixels, a value of the display luminance of this pixel is a quintuple of the display luminance that is calculated from the SDR gamma curve 51.

Note that, in the example shown in A of FIG. 3, in a range where the input data items are less than N/2, display luminances substantially equal to each other with respect to the same input data item are calculated from the SDR gamma curve 51 and the HDR gamma curve 50. The display luminances calculated at this time are display luminances of from approximately 0 to 0.2, which correspond to the dark areas. In this way, the display luminances on the HDR gamma curve 50, which are calculated as those of the dark areas, do not significantly vary from those on the SDR gamma curve 51. Thus, the display luminances of the dark areas with the gradations in the high dynamic range are substantially maintained similar to those with the gradations in the standard dynamic range.

Meanwhile, in a range where the input data items are more than N/2, as the input data approaches N, a difference between the luminances that are calculated from the SDR gamma curve 51 and the luminances that are calculated from the HDR gamma curve 50 with respect to the same input data item becomes more significant. In this way, the display luminances that are calculated from the HDR gamma curve 50 are not mere increments of the display luminances that are calculated from the SDR gamma curve 51, but are display luminances obtained by exponentially expanding the bright areas. With this, the projection image 11 with a high luminance that cannot be exhibited by the gradations in the standard dynamic range can be generated.

B of FIG. 3 is a graph normalized for comparing a shape of the HDR gamma curve 50 and a shape of the SDR gamma curve 51 with each other. The abscissa axis of the graph represents, commonly with respect to the HDR gamma curve 50 and the SDR gamma curve 51, the input data item of each of the pixels, which is input to the information processing device 40.

The left-hand-side ordinate axis of the graph represents the display luminances corresponding to the SDR gamma curve 51, and the right-hand-side ordinate axis of the same represents the display luminances corresponding to the HDR gamma curve 50. In B of FIG. 3, the ordinate axes on the right and left are adjusted such that the upper limit value of the display luminances on the SDR gamma curve 51 and an upper limit value of the display luminances on the HDR gamma curve 50 are indicated at the same position.

In comparison with the SDR gamma curve 51, the HDR gamma curve 50 initially rises milder in the dark region, and then becomes steeper in the bright region. Thus, the number of data items in the dark region to which eyes are sensitive can be sufficiently secured, and data items of the bright region to which the eyes are less sensitive can be expressed with high contrast. With this, with the gradations in the high dynamic range, images can be dynamically expressed to be close to actual scenery.

In this embodiment, the projection image 11 generated with the gradations in the high dynamic range is compressed, and then transmitted to the information processing device 40. A data item of this compressed image corresponds to the image information item. Generally, a process of the compression is executed in accordance with image characteristics such that image quality is not degraded. In this embodiment, the compression is performed in a format that enables the projection image 11 to be displayed with high accuracy by the HDR process and the SDR process described above.

In this embodiment, in order to compress the projection image 11 generated with the gradations in the high dynamic range, an HDR compression curve is used. The HDR compression curve is a function that compresses the image information item by keeping many of the data items of the luminances of the dark region in the projection image 11, and by thinning out the data items of the luminances in the bright region in the same. With this, compression for the transmission can be performed without degrading image feeling that is expressed by the gradations in the high dynamic range.

As the HDR compression curve, for example, an inverse curve (inverse function) of the HDR gamma curve 50 shown in A of FIG. 3 may be used. Specifically, by internal processes of the camera that takes the projection image 11, the HDR compression curve is applied to the data items of the luminances of the projection image 11. When the HDR gamma curve 50 is applied to the transmitted image information item, proper display luminances substantially equal to those indicated by an image data item before the compression can be calculated.

Note that, as shown in A of FIG. 3, in the dark region of the input data item (region close to "0" on the abscissa axis), the HDR gamma curve 50 and the SDR gamma curve 51 exhibit shapes substantially the same as each other. Further, by the HDR compression curve, many of the luminance data items of the dark region are kept (most of the information items of the display luminances are maintained). Thus, even when the SDR process is executed on the compressed image information item, the image can be displayed with high accuracy.

In this way, it can also be said that the HDR process and the SDR process in this embodiment are processes of restoring the compressed image data item. As a matter of course, the highlighting process and the standard representation process according to this embodiment are not limited to the restoration of the compressed data item. For example, conversion, expansion, and the like of the gradations may be performed.

Referring back to FIG. 1, the classification processing unit 46 compares the display luminance of each of the pixels, which is calculated by the HDR processing unit 44, and a predetermined reference luminance to each other. With this, the classification processing unit 46 generates a pixel information item of each pixel of the HDR-region image 18 (hereinafter, abbreviated as base-pixel information item), and the pixel information item of each of the pixels of the superimposition image 13 (hereinafter, abbreviated as superimposition-pixel information item).

The enlargement processing unit 47 executes an enlargement process of enlarging the superimposition image 13 in accordance with a resolution of the highlight projector 30 that projects the superimposition image 13. The processes by the classification processing unit 46 and the enlargement processing unit 47 are described in detail below.

[Generation of Base Image]

Figure 4:
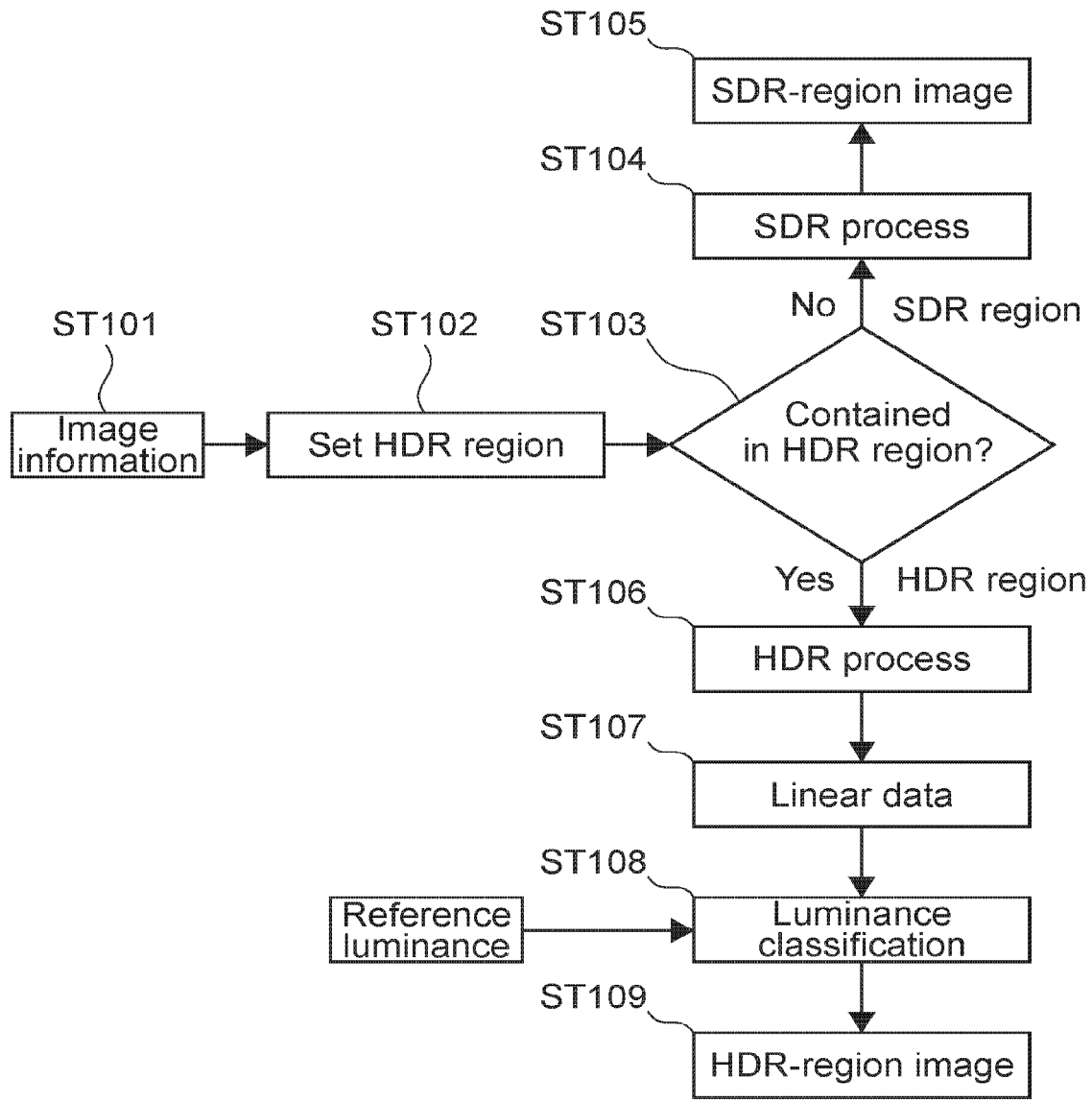
FIG. 4 A flowchart showing an example of generating the base image.

FIG. 4 is a flowchart showing an example of generating the base image 12 according to this embodiment. The video signal containing the image information item of the projection image 11 is input to the input unit 41 (Step 101). The HDR region 14 is set at the predetermined position in the projection image 11 by the region setting unit 42 (Step 102). Typically, the HDR region 14 is set on the basis of a position information item input in advance by a user. Alternatively, the HDR region 14 may be set automatically at an appropriate position by the region setting unit 42.

A determination as to whether or not to be contained in the HDR region 14 is made with respect to each of the pixels to be contained in the projection image 11 (Step 103). When one of the pixels has been determined not to be contained in the HDR region 14, that is, when this pixel has been determined to be contained in the SDR region 15, the procedure proceeds to "No" in Step 103. Then, the SDR process by the SDR processing unit 45 is executed (Step 104). In this embodiment, the display luminance in the standard dynamic range is calculated with respect to the input data item of each of the pixels.

On the basis of the display luminances calculated by the SDR process, the SDR-region image 19 is generated (Step 105). Specifically, the pixel information item corresponding to the display luminance calculated by the SDR process is generated with respect to each of the pixels to be contained in the SDR region 15. Note that, the pixel information item corresponding to the display luminance includes the video signal for causing the pixel to be displayed with this display luminance on the screen 10.

The pixel information item corresponding to the display luminance is generated in accordance, for example, with display characteristics of the base projector 20 that projects the base image 12. Note that, the pixel information item may be generated after image processes such as luminance correction are executed. The SDR-region image 19 corresponds to an image generated such that the SDR region 15 being a predetermined region in the projection image 11 can be displayed with the display luminances in the standard dynamic range.

When a determination of "Yes" is made in Step 103, that is, when one of the pixels to be contained in the projection image 11 has been determined to be contained in the HDR region 14, the HDR process by the HDR processing unit 44 is executed (Step 106). In this embodiment, the display luminance in the high dynamic range is calculated with respect to the input data item of each of the pixels.

Linear data items indicating a linear relationship with the calculated display luminances in the high dynamic range are generated (Step 107). With use of these linear data items, the image processes such as image contrast correction can be executed. Further, in this embodiment, with use of these linear data items, luminance classification by the classification processing unit 46 is performed (Step 108).

Figure 5:
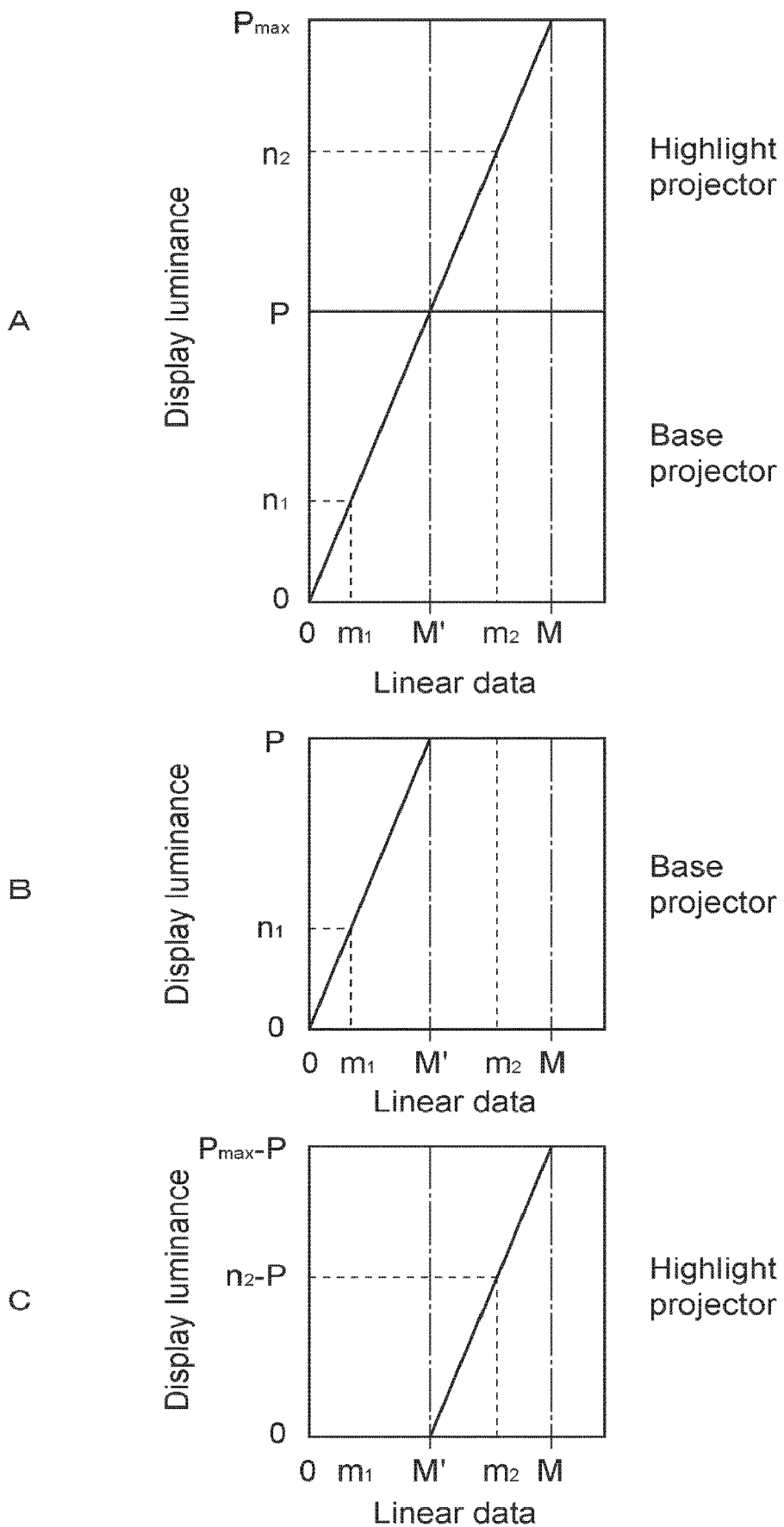
FIG. 5 Explanatory graphs showing an example of luminance classification.

FIG. 5 is explanatory graphs showing an example of the luminance classification according to this embodiment. The ordinate axis of each of the graphs shown in A of FIG. 5 to C of FIG. 5 represents the display luminances of the pixels, which are calculated by the HDR process. The abscissa axis of each of the graphs represents the linear data items that are linear with respect to the display luminances.

The luminance classification refers to a process for setting how to achieve the display luminances of the pixels in the high dynamic range, which are calculated by the HDR process, with the image superimposition by the base projector 20 and the highlight projector 30. Specifically, the calculated display luminances of the pixels are classified as display luminances of the pixels of the HDR-region image 18 and display luminances of the pixels of the superimposition image 13.

A of FIG. 5 is a graph showing the display luminances in the high dynamic range, which are calculated by the HDR process, and the linear data items corresponding thereto. B of FIG. 5 is a graph showing the display luminances to be exhibited by the base projector 20. C of FIG. 5 is a graph showing the display luminances to be exhibited by the highlight projector 30.

At the time of generating the base image 12, by the luminance classification, the display luminances of the pixels to be contained in the HDR-region image 18 in the base image 12 are calculated. In other words, the display luminances corresponding to the ordinate axis shown in B of FIG. 5 are calculated with respect to the pixels.

First, a reference luminance P is set as a reference for the classification. As shown in FIG. 4, the reference luminance P is preset, and read out when necessary.

The reference luminance P shown in A and B of FIG. 5 is set within a range equal to or less than the maximum-possible display luminance to be exhibited by the base projector 20. In this embodiment, the reference luminance P is set equal to the maximum-possible display luminance to be exhibited by the base projector 20. As shown in A of FIG. 5, linear data items 0 to M are set correspondingly to display luminances 0 to Pmax in the high dynamic range. Of those, a linear data item corresponding to the reference luminance P is represented by M'.

With respect to each of the pixels in the HDR region 14, a determination as to whether or not the display luminance calculated by the HDR process is lower than the reference luminance P is made. When the calculated display luminance is lower than the reference luminance P, the calculated display luminance is used as a display luminance of corresponding one of the pixels in the HDR region 14. When the calculated display luminance is equal to or higher than the reference luminance P, the reference luminance P is used as the display luminance of corresponding one of the pixels in the HDR region 14.

In this embodiment, the luminance classification is performed with use of the linear data items. Specifically, with respect to each of the pixels in the HDR region 14, a determination as to whether or not the linear data item is less than the linear data item M' corresponding to the reference luminance P is made. As shown in A and B of FIG. 5, when a linear data item $m_1$ (<M') is calculated, a display luminance $n_1$ corresponding to the linear data item $m_1$ is used as the display luminance of corresponding one of the pixels in the HDR region 14. When a linear data item $m_2$ (≥M') is calculated, the reference luminance P corresponding to the linear data item M' is used as the display luminance of corresponding one of the pixels in the HDR region 14.

In this way, when the display luminance calculated by the HDR process is lower than the reference luminance P (when "Linear Data Item<M'" is established), the calculated display luminance is used as it is as the display luminance of corresponding one of the pixels in the HDR region 14. When the display luminance calculated by the HDR process is higher than the reference luminance P (when "Linear Data Item≥M'" is established), the corresponding one of the pixels in the HDR region 14 is determined as a pixel that needs to be superimposed by the image from the highlight projector 30. As a display luminance of this pixel, the reference luminance P (that is, maximum display luminance by the base projector 20) is used.

Note that, whether or not to use the linear data items at the time of performing the luminance classification may be arbitrarily selected. The display luminances calculated by the HDR process may be used as they are, or other data items corresponding to the display luminances may be used.

With respect to each of the pixels to be contained in the HDR region 14, a pixel information item for achieving the display luminance calculated by the luminance classification is generated. In other words, with respect to each of the pixels, a pixel information item corresponding to the display luminance calculated by the luminance classification is generated. The pixel information item generated in this way corresponds to the base-pixel information item. With this, the HDR-region image 18 is generated (Step 109).

On the basis of the SDR-region image 19 and the HDR-region image 18, the image generation unit 43 generates the base image 12 containing the pixel information item of each of the pixels. The base image 12 is output as a video signal to the base projector 20.

[Generation of Superimposition Image]

Figure 6:
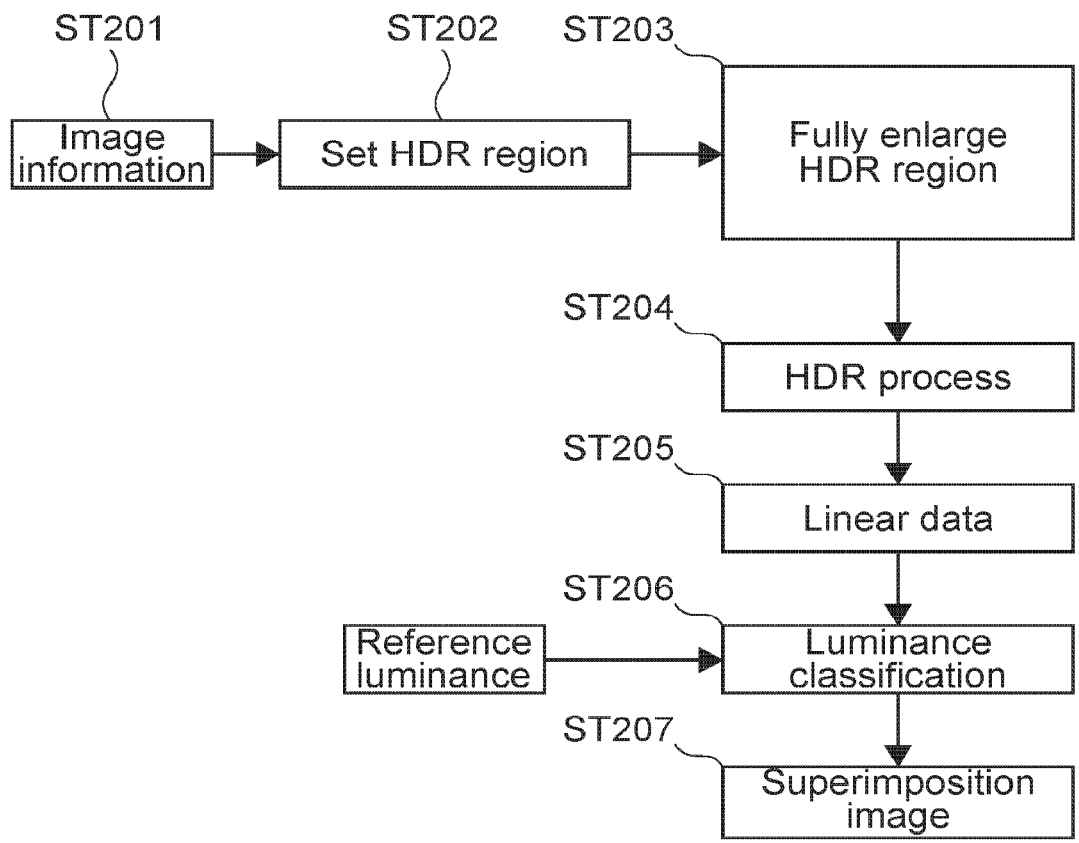
FIG. 6 A flowchart showing an example of generating the superimposition image.

FIG. 6 is a flowchart showing an example of generating the superimposition image 13 according to this embodiment. The video signal containing the image information item of the projection image 11 is input to the input unit 41 (Step 201). The HDR region 14 is set by the region setting unit 42 (Step 202), and the pixels to be contained in the HDR region 14 are extracted.

Figure 7:
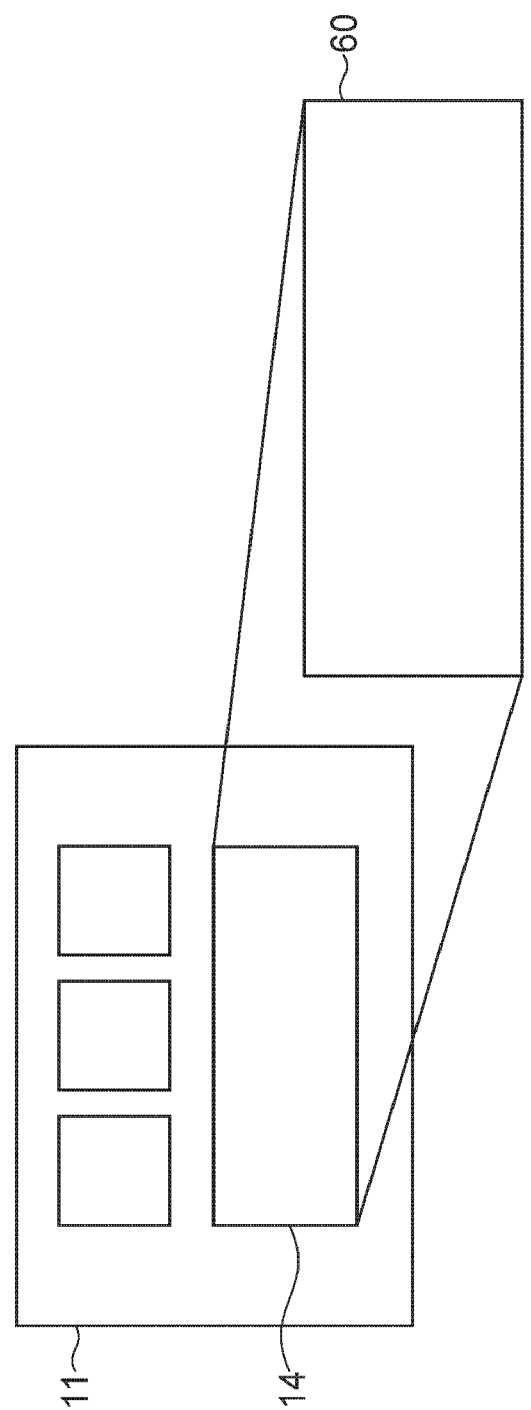
FIG. 7 An explanatory schematic diagram showing an example of an enlargement process.

FIG. 7 is an explanatory schematic diagram showing an example of the enlargement process according to this embodiment. The enlargement processing unit 47 executes the enlargement process of enlarging the image in the HDR region 14 (Step 203). The enlargement process of enlarging the image in the HDR region 14 is a process of enlarging the image that is constituted by the pixels to be contained in the HDR region 14 into an image that is constituted by a larger number of pixels, that is, an image of a larger size. With this, an enlarged image 60 shown in FIG. 7 is generated.

It can also be said that the enlargement process is a process of reconstituting the image in the HDR region 14 by increasing the number of its pixels. A method of setting a luminance value of each of the pixels at the time of increasing the number of the pixels is not limited. For example, pixels with the same luminance are arrayed vertically and horizontally in a two-by-two (2×2) grid correspondingly to the pixels in the HDR region 14 before the enlargement. With this, the enlarged image 60 of a quadruple size is generated. Alternatively, arbitrary methods such as interpolation of the luminance values may be employed.

The size of the enlarged image 60 is determined in accordance with the display resolution of the highlight projector 30. Specifically, the number of pixels (size), which is used at the time when the superimposition image 13 is displayed by the highlight projector 30, is set as the size of the enlarged image 60. Typically, a maximum-possible size that allows a shape of the superimposition image 13 (such as its aspect ratio) to be expressed therein is set. With this, even when the superimposition image 13 is optically downsized for the image superimposition, a high display luminance can be exhibited.

The HDR process by the HDR processing unit 44 is executed on each of the pixels to be contained in the enlarged image 60. With this, their respective display luminances in the high dynamic range are calculated (Step 204). Linear data items indicating a linear relationship with the calculated display luminances are generated (Step 205). With use of these linear data items, the luminance classification is performed by the classification processing unit 46 (Step 206).

At the time of generating the superimposition image 13, by the luminance classification, the display luminances of the pixels to be contained in the superimposition image 13 are calculated. In other words, the display luminances corresponding to the ordinate axis shown in C of FIG. 5 are calculated with respect to the pixels. Note that, the luminance classification is performed with reference to the reference luminance P in Step 108 of FIG. 4.

With respect to each of the pixels in the enlarged image 60, the determination as to whether or not the display luminance calculated by the HDR process is lower than the reference luminance P is made. When the calculated display luminance is lower than the reference luminance P, a display luminance "0" (zero) is used as a display luminance of corresponding one of the pixels of the enlarged image 60. When the calculated display luminance is equal to or higher than the reference luminance P, a difference between the calculated display luminance and the reference luminance P is used as the display luminance of corresponding one of the pixels of the enlarged image 60. In other words, "Display Luminance=Display Luminance by HDR Process−Reference Luminance P" is established.

As shown in C of FIG. 5, in this embodiment, the luminance classification is performed with use of the linear data items. When the linear data item $m_1$ (<M') is calculated, the display luminance of corresponding one of the pixels of the enlarged image 60 is "0." When the linear data item $m_2$ (≥M') is calculated, a value $n_2$–P obtained by subtraction of the reference luminance P from a display luminance $n_2$ corresponding to the linear data item $m_2$ is used as the display luminance of corresponding one of the pixels of the enlarged image 60.

In this way, when the display luminance calculated by the HDR process is lower than the reference luminance P (when "Linear Data Item<M'" is established), the highlight projector 30 displays a darkest black color (color corresponding to the display luminance of "0"). When the display luminance calculated by the HDR process is higher than the reference luminance P (when "Linear Data Item M'" is established), the corresponding one of the pixels of the enlarged image 60 is determined as a pixel to be displayed with a brightness that cannot be exhibited by the base projector 20. Thus, as a display luminance of this pixel, the value ($n_2$–P) obtained by the subtraction of the luminance that is exhibited by the base projector 20 (reference luminance P) from an original luminance (display luminance $n_2$ calculated by the HDR process) is used.

With respect to each of the pixels in the enlarged image 60, the pixel information item corresponding to the display luminance calculated by the luminance classification is generated. The pixel information item generated in this way corresponds to the superimposition-pixel information item. With this, the superimposition image 13 is generated (Step 207). The superimposition image 13 is projected to display the HDR region in the projection image 11 with the display luminances in the high dynamic range.

The generated superimposition image 13 is output as a video signal to the highlight projector 30. Note that, when the superimposition image 13 is displayed by the highlight projector 30, zooming in/out and the like are controlled as appropriate. With this, the image size is reduced. Thus, the superimposition image 13 that is projected onto the screen 10 can be properly superimposed on the base image 12.

Note that, at the time when the superimposition-pixel information item corresponding to the display luminance is generated with respect to each of the pixels in the enlarged image 60, an increase in display luminance in accordance with the image downsizing is taken into account. For example, the superimposition-pixel information item of each of the pixels in the enlarged image is generated by applying a parameter in accordance with the increase in display luminance to the pixel information item for achieving a predetermined display luminance. As a matter of course, such parameters need not necessarily be applied.

The base image 12 and the superimposition image 13 are projected respectively by the base projector 20 and the highlight projector 30 onto the screen 10, and the projection image 11 constituted by the base image 12 and the superimposition image 13 is displayed. On the screen 10, the HDR-region image 18 in the base image 12 and the superimposition image 13 are displayed in a superimposed manner (refer to FIG. 1). With this, in the HDR region 14 of the projection image 11, the highlight image 17 is displayed with the display luminances in the high dynamic range. Further, in the SDR region 15 of the projection image 11, the SDR-region image 19 is displayed with the display luminances in the standard dynamic range.

Figure 8:
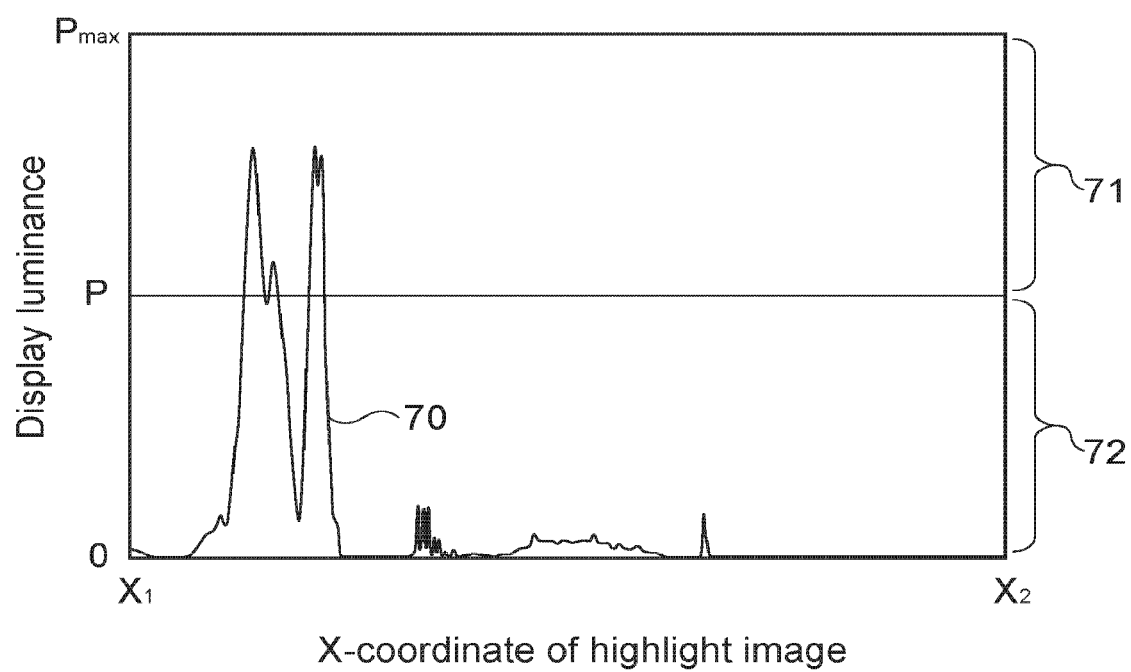
FIG. 8 A schematic graph showing an example of a line profile of display luminances in a highlight image that is displayed in an HDR region of the projection image.

FIG. 8 is a schematic graph showing an example of a line profile of the display luminances in the highlight image 17 that is displayed in the HDR region 14 of the projection image 11. The X-axis direction corresponds to a lateral direction of the highlight image 17 shown in A of FIG. 2, and X-coordinates at a left-hand-side end and a right-hand-side end are represented by $X_1$ and $X_2$. FIG. 8 shows a line profile 70 indicating display luminances on a certain one line along the X-axis direction in the highlight image 17.

The superimposition image 13 is projected by the highlight projector 30, and hence the display luminances each equal to or higher than the reference luminance P, that is, display luminances in a luminance range 71 are achieved. Meanwhile, the display luminances lower than the reference luminance P, that is, display luminances in a luminance range 72 are achieved by the HDR-region image 18 projected by the base projector 20.

As described above, in the image projection system 100 according to this embodiment, the region setting unit 42 sets the HDR region 14 at the predetermined position in the projection image 11 to be a projection target. On the basis of the input image-information item, the image generation unit 43 generates the base image 12 containing the HDR-region image 18, and the superimposition image 13 that is superimposed on the HDR-region image 18. With this, high-quality images can be displayed with use of the plurality of image projection devices.

When an image is projected with use of a single image-projection device (projector), a luminance that can be exhibited by this projection image is limited by display characteristics of the projector, such as characteristics of a light source and a lens installed in the projector. Thus, it is difficult for the single projector to expand a range of the luminances that can be exhibited, that is, to secure a wide dynamic range of the luminances. Thus, it is difficult for the single projector to achieve a high luminance peak or to secure high luminance contrast.

In the image projection system 100 according to this embodiment, the base projector 20 projects the base image 12. Further, the highlight projector 30 projects the superimposition image 13 toward the predetermined region (HDR region 14) in the base image 12. When the base image 12 and the superimposition image 13 are superimposed on each other on the screen 10, the projection image 11 is displayed. With this, in the HDR region 14 of the projection image 11, the luminance that the base projector 20 exhibits and the luminance that the highlight projector 30 exhibits are added to each other. As a result, the dynamic range of the luminances can be expanded. Thus, in the HDR region 14 of the projection image 11, images can be displayed with the gradations in the high dynamic range. As a result, the high luminance peak can be achieved, and expressive contrast can be exhibited. With this, the images can be clearly displayed with less blown-out highlights and blocked-up shadows.

Further, in the image projection system 100, the SDR-region image 19 is generated with the gradations in the standard dynamic range, which can be exhibited by the single projector. Thus, in the SDR region 15 of the projection image 11, the base projector 20 alone can properly display images.

In this way, according to this embodiment, in the projection image 11, images with the gradations of two different types, specifically, with the gradations in the high dynamic range and the gradations in the standard dynamic range, can be displayed together. In the HDR region 14 where images are displayed with the gradations in the high dynamic range, partial stacking, that is, a projection of the HDR-region image 18 and the superimposition image 13 in a superimposed manner is performed. With this, projection light beams from the highlight projector 30 are concentrated into the HDR region 14, and hence the luminances can be efficiently expanded.

For example, when a full stacking projection, that is, projections by all projectors are performed with respect to a common display region, projection light beams from these projectors spread all over the display region. Meanwhile, by the partial stacking projection, the projection light beams can be concentrated into a predetermined region. Thus, luminances that can be added per projector are higher at the time of the partial stacking projection than at the time of the full stacking projection. Thus, even with a smaller number of devices, the luminance dynamic range can be efficiently expanded. With this, desired luminances can be achieved with a small number of projectors, and hence power consumption and cost can be reduced.

In this embodiment, the HDR process and the SDR process are executed on the basis of one image-information item (video signal), and the image with the gradations in the high dynamic range and the image with the gradations in the standard dynamic range are respectively generated. Thus, for example, it is unnecessary to perform operations of independently generating a plurality of images with gradations of different types and editing these images. In addition, it is also unnecessary to prepare, for example, a plurality of input wires for independently transmitting video signals of the plurality of images. With this, image editing operations, projector settings, and the like can be simplified.

Second Embodiment

Now, an image projection system according to a second embodiment of the present technology is described. In the description hereinbelow, description of parts having the same configurations and the same functions as those in the image projection system 100 of the above-described embodiment is omitted or simplified.

In the first embodiment, images are displayed by two projectors, that is, the base projector 20 and the highlight projector 30. In this embodiment, a base projector and a plurality of highlight projectors are used. In other words, images are displayed by a three or more projectors.

Figure 9:
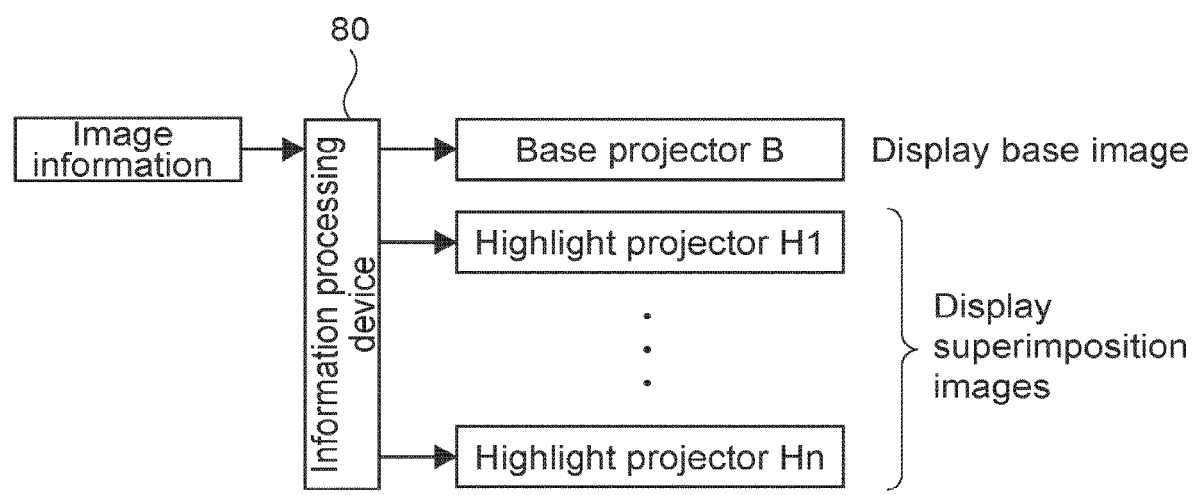
FIG. 9 A block diagram showing a data flow in an image projection system according to a second embodiment.

FIG. 9 is a block diagram showing a data flow in the image projection system according to the second embodiment. A video signal containing an image information item of a projection image is input to an input unit of an information processing device 80. The information processing device 80 generates a base image and "n" superimposition images, specifically, first to n-th superimposition images on the basis of the input image-information item, and outputs these superimposition images respectively to a base projector B and highlight projectors H1 to Hn. In order that the images can be projected into an HDR region in a superimposed manner, projection directions, apertures, and the like of the highlight projectors H1 to Hn are set as appropriate.

Figure 10:
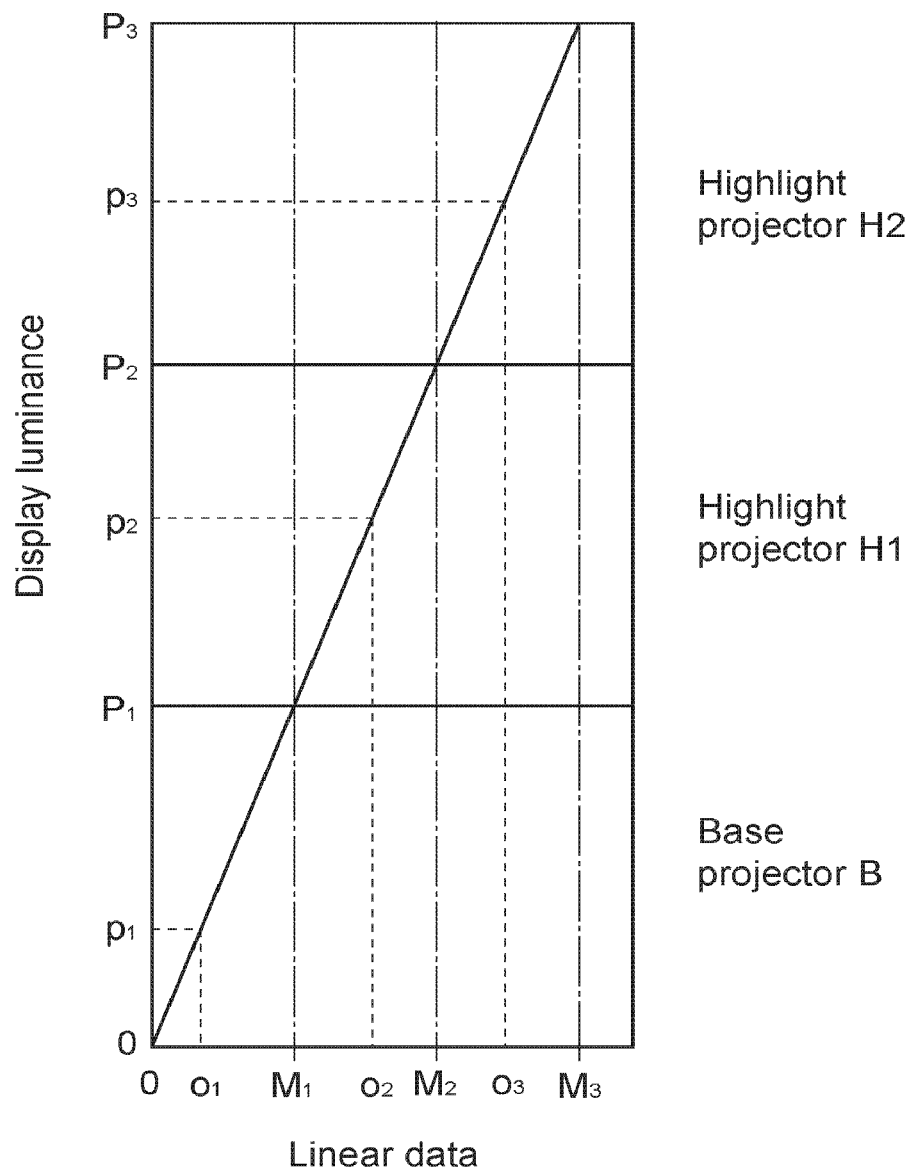
FIG. 10 An explanatory graph showing another example of the luminance classification.

FIG. 10 is an explanatory graph showing an example of luminance classification according to this embodiment. The ordinate axis of the graph shown in FIG. 10 represents the display luminances in the high dynamic range, which are calculated by the HDR process. Further, the abscissa axis of the graph represents linear data items that linearly correspond to the display luminances calculated by the HDR process. In the exemplary case of the luminance classification shown in FIG. 10, images are displayed with use of the one base projector B and the two highlight projectors H1 and H2.

First, the classification processing unit 46 performs the luminance classification for generating the HDR-region image in the base image (which corresponds to Step 108 in FIG. 4). A first reference luminance $P_1$ is set as a reference for the classification.

With respect to each of the pixels in the HDR region 14, a determination as to whether or not the display luminance calculated by the HDR process is lower than the first reference luminance $P_1$ is made. When the calculated display luminance is lower than the first reference luminance $P_1$, the calculated display luminance is used as a display luminance of corresponding one of the pixels in the HDR region 14. When the calculated display luminance is equal to or higher than the first reference luminance $P_1$, the first reference luminance $P_1$ is used as the display luminance of corresponding one of the pixels in the HDR region 14.

As shown in FIG. 10, in this embodiment, the luminance classification is performed with use of the linear data items. When a linear data item $o_1$ ($<M_1$) is calculated, a display luminance $p_1$ corresponding to the linear data item of is used as the display luminance of corresponding one of the pixels in the HDR region 14. When a linear data item equal to or more than $M_1$ is calculated, the first reference luminance $P_1$ corresponding to the linear data item $M_1$ is used as the display luminance of corresponding one of the pixels in the HDR region 14. With respect to each of the pixels in the HDR region 14, the base-pixel information item for achieving the display luminance calculated by the luminance classification is generated. In this way, the HDR-region image is generated (which corresponds to Step 109 in FIG. 4).

The classification processing unit 46 performs the luminance classification for generating the first and the second superimposition images (which corresponds to Step 206 in FIG. 6). A second reference luminance $P_2$ higher than the first reference luminance $P_1$ is set as another reference for the classification. In other words, the second reference luminance to be set satisfies $P_1<P_2$. The luminance classification is performed with use of the first and the second reference luminances $P_1$ and $P_2$.

First, display luminances of the first superimposition image are calculated. With respect to each of the pixels in the enlarged image generated by the enlargement processing unit, a determination as to whether or not the display luminance calculated by the HDR process is equal to or higher than the first reference luminance $P_1$ and lower than the second reference luminance $P_2$ is made.

When the calculated display luminance is lower than the first reference luminance $P_1$, the display luminance "0" (zero) is used as a display luminance of corresponding one of the pixels. When the calculated display luminance is equal to or higher than the first reference luminance $P_1$ and lower than the second reference luminance $P_2$, a difference between the calculated display luminance and the first reference luminance $P_1$ is used as the display luminance of corresponding one of the pixels. When the calculated display luminance is equal to or higher than the second reference luminance $P_2$, a difference between the second reference luminance $P_2$ and the first reference luminance $P_1$ is used as the display luminance of corresponding one of the pixels.

As shown in FIG. 10, the luminance classification is performed with use of the linear data items. When the linear data item $o_1$ ($<M_1$) is calculated, the display luminance of corresponding one of the pixels is "0." When a linear data item $o_2$ ($M_1 \leq o_2 < M_2$) is calculated, a value $p_2-P_1$ obtained by subtraction of the first reference luminance $P_1$ from a display luminance $p_2$ corresponding to the linear data item $o_2$ is used as the display luminance of corresponding one of the pixels. When a linear data item $o_3$ ($\geq M_2$) is calculated, a value $P_2-P_3$ obtained by subtraction of the first reference luminance $P_3$ from the second reference luminance $P_2$ is used as the display luminance of corresponding one of the pixels. With respect to each of the pixels, a first-superimposition-pixel information item for achieving the display luminance calculated by the luminance classification is generated. In this way, the first superimposition image is generated (which corresponds to Step 207 in FIG. 6).

Next, the second superimposition image is generated. With respect to each of the pixels in the enlarged image, a determination as to whether or not the display luminance calculated by the HDR process is higher than the second reference luminance $P_2$ is made. When the calculated display luminance is lower than the second reference luminance $P_2$, the display luminance "0" (zero) is used as a display luminance of corresponding one of the pixels. When the calculated display luminance is equal to or higher than the second reference luminance $P_2$, a difference between the calculated display luminance and the second reference luminance $P_2$ is used as the display luminance of corresponding one of the pixels.

As shown in FIG. 10, the luminance classification is performed with use of the linear data items. When a linear data item smaller than $M_2$ is calculated, the display luminance of corresponding one of the pixels is "0." When a linear data item $o_3$ ($\geq M_2$) is calculated, a value $p_3-P_2$ obtained by subtraction of the second reference luminance $P_2$ from a display luminance $p_3$ corresponding to the linear data item $o_3$ is used as the display luminance of corresponding one of the pixels. With respect to each of the pixels, a second-superimposition-pixel information item for achieving the display luminance calculated by the luminance classification is generated. In this way, the second superimposition image is generated (which corresponds to Step 207 in FIG. 6).

The information processing device 80 outputs the base image containing the generated HDR-region image, the first superimposition image, and the second superimposition image respectively to the base projector B, the highlight projector H1, and the highlight projector H2. The first and the second superimposition images are projected in a superimposed manner by the highlight projectors H1 and H2 onto the HDR-region image in the base image projected by the base projector B. With this, the projection image is displayed. In this way, image representation in a superimposed manner by the three projectors can be performed, and the luminance dynamic range can be sufficiently expanded.

Figure 11:
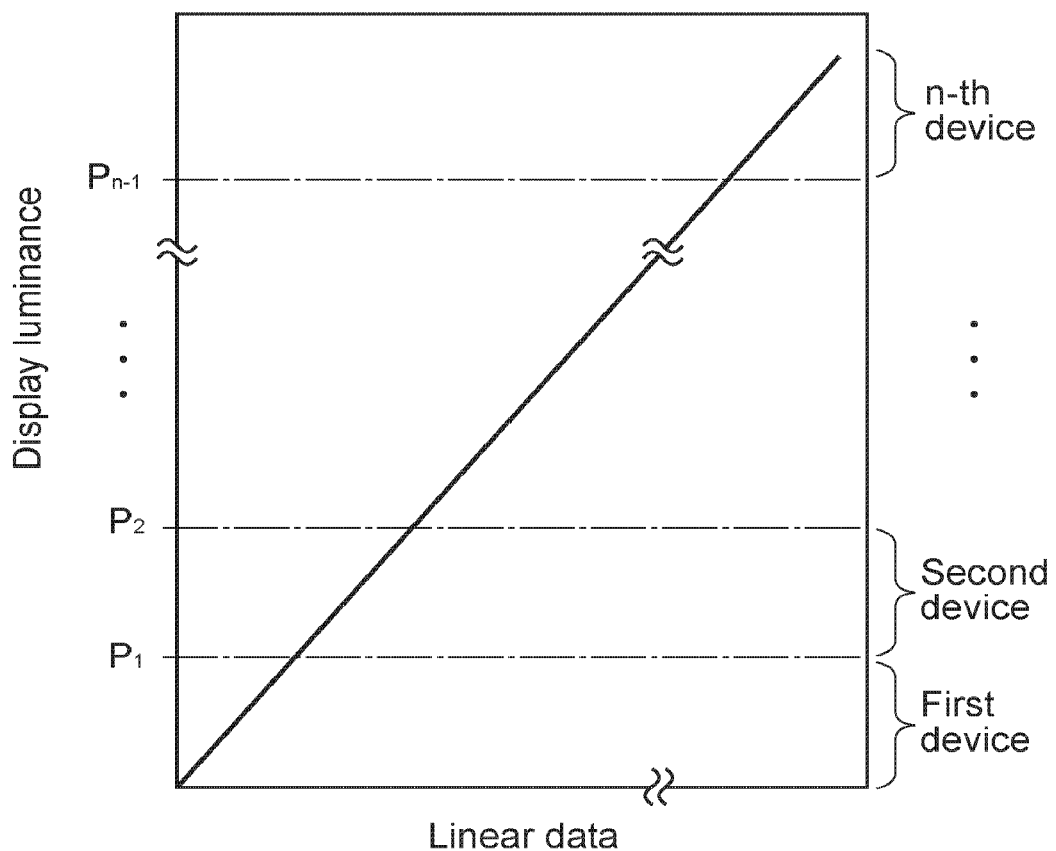
FIG. 11 An explanatory graph showing still another example of the luminance classification at a time when "n" highlight projectors are used.

FIG. 11 is an explanatory graph showing an example of luminance classification at a time when "n" highlight projectors are used. As shown in FIG. 11, as references for the luminance classification, the first reference luminance $P_1$, the second reference luminance $P_2$, ..., and an (n−1)th reference luminance are set such that $P_1<P_2<\ldots<P_{n-1}$, is established. For example, a k-th superimposition image is generated by performing the luminance classification with use of a k-th reference luminance $P_k$ and a (k+1)th reference luminance $P_{k+1}$ as the references.

For example, the luminance classification is similarly performed with the first reference luminance $P_1$ and the second reference luminance $P_2$ shown in FIG. 10 being regarded as the k-th reference luminance $P_k$ and the (k+1)th reference luminance $P_{k+1}$. Specifically, linear data items $M_k$ and $M_{k+1}$ corresponding to the k-th reference luminance $P_k$ and the (k+1)th reference luminance $P_{k+1}$ are set. When a linear data item smaller than $M_k$ is calculated with respect to each of the pixels, the display luminance of corresponding one of the pixels is "0." When a linear data item $o_k$ ($M_k \leq o_k \leq M_{k+1}$) is calculated, a value $p_k-P_k$ obtained by subtraction of the k-th reference luminance $P_k$ from a display luminance $p_k$ corresponding to the linear data item $o_k$ is used as the display luminance of corresponding one of the pixels. When a linear data item equal to or more than $M_{k+1}$ is calculated, a value $P_{k+1}-P_k$ obtained by subtraction of the k-th reference luminance $P_k$ from the (k+1)th reference luminance $P_{k+1}$ is used as the display luminance of corresponding one of the pixels. With respect to each of the pixels, a k-th-superimposition-pixel information item for achieving the display luminance calculated by the luminance classification is generated. In this way, the k-th superimposition image is generated.

As described above, it is possible to cause an arbitrary number of projectors to respectively generate corresponding superimposition images. Thus, it is possible to superimpose an arbitrary number of superimposition images to be superimposed on the base image. With this, the luminance dynamic range can be sufficiently expanded, and hence images having the high luminance peaks can be displayed.

Other Embodiments

The present technology is not limited to the embodiments described hereinabove, and various other embodiments may be carried out.

Figure 12:
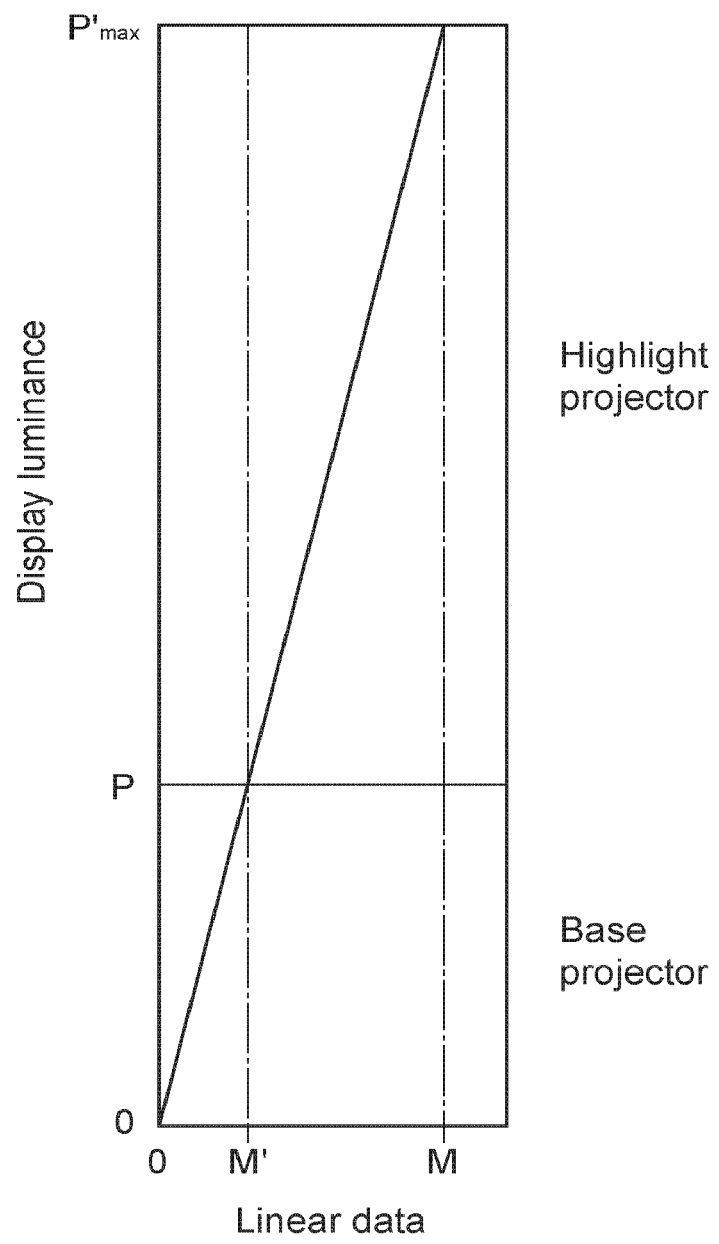
FIG. 12 A graph showing an example of luminance ranges corresponding to projectors.

FIG. 12 is a graph showing an example of luminance ranges corresponding to the projectors. In the above-described embodiments, as shown in A of FIG. 5, the range of the luminances that are exhibited by the base projector (from 0 to P), and the range of the luminances that are exhibited by the highlight projector (from P to Pmax) have substantially the same luminance band. Instead, the luminance range of the highlight projector may be set as appropriate.

For example, when the partial stacking is performed, the luminances that can be exhibited by the highlight projector may be set high. Thus, as shown in FIG. 12, the luminance range of the highlight projector may be increased. With this, the number of the highlight projectors can be reduced. Note that, in accordance with the luminance range of the highlight projector, the display luminances that are calculated by the HDR process may be adjusted as appropriate. Also in this case, the number of the projectors can be reduced.

In the first embodiment, the maximum-possible display luminance to be exhibited by the base projector (maximum luminance by the base projector) is set as the reference luminance. How the reference luminance is set is not limited thereto.

For example, in a case where the range of the luminances that can be exhibited by the highlight projector is sufficiently wide, a value less than the maximum luminance by the base projector may be set as the reference luminance. With this, the reference luminance is set sufficiently high. As a result, heat generation and the like in the base projector can be curbed, and hence stability of the device can be secured. Alternatively, as appropriate, the reference luminance may be set on the basis of a peak luminance of the projection image such that the peak luminance can be efficiently exhibited. With this, load on the base projector and the highlight projector can be reduced, and hence images can be efficiently displayed.

In the first embodiment, the image information item of the projection image, which is input to the input unit, is generated with the gradations in the high dynamic range. Instead, the image information item to be input is not limited in type or format. For example, it is possible to input an image information item of a projection image in which the HDR region is generated with the gradations in the high dynamic range, and in which the SDR region is generated with the gradations in the standard dynamic range. In other words, it is possible to input an image information item of a projection image containing images with the gradations of the two different types. In this case, the SDR processing unit executes the SDR process to restore the image in the standard dynamic range, and the HDR processing unit executes the HDR process to restore the image in the high dynamic range. With this, a processing time period can be shortened, and a processing speed can be increased.

Alternatively, it is also possible to input an image information item of a projection image in which the HDR region and the SDR region are each generated with the gradations in the standard dynamic range. In this case, the SDR processing unit executes the SDR process to restore the image in the standard dynamic range. The HDR processing unit executes, for example, a process of expanding/converting the gradations in the standard dynamic range to the gradations in the high dynamic range. With this, video archives and the like recorded with the gradations in the standard dynamic range can be displayed with the gradations in the high dynamic range.

For example, a video signal of a hybrid log gamma (HLG) format may be used as the image information item to be input. In the video signal of the HLG format, luminance data items of dark areas are compressed into a related-art gamma curve, and luminance data items of bright areas are compressed into a log curve. Thus, the video signal of the HLG format is highly compatible with related-art display devices. In this case, the HDR processing unit can calculate original display luminances from the video signal of the HLG format by using an inverse curve of a predetermined compression curve that is used in the HLG format. Further, the SDR processing unit can calculate the display luminances in the standard dynamic range from the video signal of the HLG format by using the related-art gamma curve. With this, the image projection system can be easily established with use of, for example, a general projector. Further, troubles due, for example, to a difference in format of the video signal can be avoided, and hence reliability of the system can be increased. Note that, the format of the video signal is not limited, and other formats may be used.

In this way, the HDR processing unit and the SDR processing unit execute the HDR process and the SDR process as appropriate in accordance with types or formats of the input image-information item. As a matter of course, the present technology is not limited thereto, and is applicable also to a case of executing other processes such as color emphasis.

In the description hereinabove, the information processing method according to the present technology, which including generating the base image and the superimposition image, is carried out by the information processing device connected to the base projector and the highlight projector. The present technology is not limited thereto, and the information processing method according to the present technology may be carried out by the base projector or the highlight projector. In other words, the functions of the information processing device may be provided to either one of the projectors. In this case, the projector operates as the information processing device according to the present technology.

Further, the information processing method according to the present technology need not necessarily be carried out by the computer to which the image information items are input. The image projection system according to the present technology may be established by cooperation of the computer to which the image information items are input, and other computers communicable therewith via, for example, a network.

In other words, the information processing method and the program according to the present technology can be executed not only by a computer system constituted by a single computer, but also by a computer system in which a plurality of computers cooperates with each other. Note that, the "system" herein refers to a collection of a plurality of components (such as devices and modules (parts)), and all the components need not necessarily provided in the same casing. Therefore, both a plurality of devices contained in independent casings and connected to each other via a network, and a single device having one casing containing a plurality of modules correspond to the "system."

At the time when the information processing method and the program according to the present technology are executed by the computer system, the HDR process, the SDR process, the enlargement process, and the like may be executed by the single computer, or these processes may be executed by the different computers. Further, the execution of the processes by a predetermined one of the computers includes causing other ones of the computers to execute some or all of the processes, and acquiring results therefrom.

Specifically, the information processing method and the program according to the present technology are applicable also to a configuration of cloud computing in which one function is shared by a plurality of devices via a network and processed in cooperation with each other.

At least two of the features described hereinabove of the present technology may be combined with each other. In other words, various features described in the embodiments may be arbitrarily combined with each other regardless of the embodiment. Further, the various advantages described hereinabove are merely examples, and hence are not limited thereto. Thus, other advantages may be additionally obtained.

Note that, the present technology may also employ the following configurations.

(1) An information processing device, including:
an input unit to which an image information item of an image to be a projection target is input;

a setting unit that sets a superimposition region at a predetermined position in the image to be the projection target; and a generation unit that generates, on the basis of the input image-information item, a base image that contains an image of the set superimposition region, and a superimposition image that is superimposed onto the image of the superimposition region in the base image.

(2) The information processing device according to Item (1), in which the generation unit executes a highlighting process on a part of the input image-information item, the part corresponding to the superimposition region, and a standard representation process on another part of the input image-information item, the other part corresponding to another region, to generate the base image and the superimposition image.

(3) The information processing device according to Item (2), in which the highlighting process is a process of calculating a display luminance of each pixel to be contained in the superimposition region, and the generation unit generates both the image of the superimposition region and the superimposition image on the basis of the calculated display luminance of each of the pixels.

(4) The information processing device according to Item (3), in which the image of the superimposition region contains a pixel information item of each pixel of the image of the superimposition region, the superimposition image contains a pixel information item of each pixel of the superimposition image, the generation unit compares the calculated display luminance of each of the pixels and a predetermined reference luminance to each other to generate both a base-pixel information item being the pixel information item of corresponding one of the pixels of the image of the superimposition region, and a superimposition-pixel information item being the pixel information item of corresponding one of the pixels of the superimposition image.

(5) The information processing device according to Item (4), in which when the calculated display luminance is lower than the predetermined reference luminance, the generation unit generates, with respect to corresponding one of the pixels to be contained in the superimposition region, a pixel information item corresponding to the calculated display luminance as the base-pixel information item, and a pixel information item corresponding to a display luminance of zero as the superimposition-pixel information item.

(6) The information processing device according to Item (4) or (5), in which when the calculated display luminance is higher than the predetermined reference luminance, the generation unit generates, with respect to corresponding one of the pixels to be contained in the superimposition region, a pixel information item corresponding to the predetermined reference luminance as the base-pixel information item, and a pixel information item corresponding to a difference between the calculated display luminance and the predetermined reference luminance as the superimposition-pixel information item.

(7) The information processing device according to any one of Items (4) to (6), in which the generation unit generates, respectively on the basis of a first reference luminance and a second reference luminance that is higher than the first reference luminance, a first superimposition image and a second superimposition image that are superimposed on the image of the superimposition region.

(8) The information processing device according to Item (7), in which the first superimposition image contains first-superimposition-pixel information items each being a pixel information item of corresponding one of pixels of the first superimposition image, the second superimposition image contains second-superimposition-pixel information items each being a pixel information item of corresponding one of pixels of the second superimposition image, when the calculated display luminance is lower than the first reference luminance, the generation unit generates, with respect to corresponding one of the pixels to be contained in the superimposition region, a pixel information item corresponding to the calculated display luminance as the base-pixel information item, and pixel information items each corresponding to a display luminance of zero as corresponding one of the first-superimposition-pixel information items and corresponding one of the second-superimposition-pixel information items.

(9) The information processing device according to Item (7) or (8), in which when the calculated display luminance is higher than the first reference luminance and lower than the second reference luminance, the generation unit generates, with respect to corresponding one of the pixels to be contained in the superimposition region, a pixel information item corresponding to the first reference luminance as the base-pixel information item, a pixel information item corresponding to a difference between the calculated display luminance and the first reference luminance as corresponding one of the first-superimposition-pixel information items, and a pixel information item corresponding to a display luminance of zero as corresponding one of the second-superimposition-pixel information items.

(10) The information processing device according to any one of Items (7) to (9), in which when the calculated display luminance is higher than the second reference luminance, the generation unit generates, with respect to corresponding one of the pixels to be contained in the superimposition region, a pixel information item corresponding to the first reference luminance as the base-pixel information item, a pixel information item corresponding to a difference between the second reference luminance and the first reference luminance as corresponding one of the first-superimposition-pixel information items, and a pixel information item corresponding to a difference between the calculated display luminance and the second reference luminance as corresponding one of the second-superimposition-pixel information items.

(11) The information processing device according to any one of Items (4) to (10), in which
the predetermined reference luminance is set on the basis of at least one of
a peak luminance of the image to be the projection target,
a luminance that can be exhibited by an image projection device that projects the base image, or
a luminance that can be exhibited by an image projection device that projects the superimposition image.
(12) The information processing device according to any one of Items (3) to (11), in which
the highlighting process is a process of calculating a display luminance in a high dynamic range of each of the pixels to be contained in the superimposition region.
(13) The information processing device according to any one of Items (2) to (12), in which
the standard representation process is a process of calculating a display luminance of each pixel to be contained in the other region, and
the generation unit generates the base image on the basis of the calculated display luminance of each of the pixels to be contained in the other region.
(14) The information processing device according to Item (13), in which
the standard representation process is a process of calculating a display luminance in a standard dynamic range of each of the pixels to be contained in the other region.
(15) The information processing device according to any one of Items (1) to (14), in which
the generation unit executes an enlargement process of enlarging the superimposition image in accordance with a resolution of an image projection device that projects the superimposition image.
(16) The information processing device according to any one of Items (1) to (15), in which
an image information item of an image in a high dynamic range is input to the input unit.
(17) The information processing device according to any one of Items (1) to (16), in which
an image information item of an image containing a plurality of display regions is input to the input unit, and
the setting unit sets at least one of the plurality of display regions as the superimposition region.

REFERENCE SIGNS LIST

P reference luminance
$P_1$ first reference luminance
$P_2$ second reference luminance
11 projection image
12 base image
13 superimposition image
14 HDR region
15 SDR region
18 HDR-region image
19 SDR-region image
20 base projector
30 highlight projector
40, 80 information processing device
41 input unit
42 region setting unit
43 image generation unit
44 HDR processing unit
45 SDR processing unit
46 classification processing unit
47 enlargement processing unit
100 image projection system

The invention claimed is:
1. An information processing device, comprising:
processing circuitry configured to:
receive input data of a projection target image;
set a superimposition region in the projection target image;
perform a base representation process according to a first portion of the input data to calculate first display luminance values in a region of the projection target image other than the superimposition region;
perform a highlighting process according to a second portion of the input data to calculate second display luminance values in the superimposition region;
generate, according to the first display luminance values and the second display luminance values, a base image that contains a region image corresponding to the set superimposition region in the projection target image; and
generate, according to the second display luminance values, a superimposition image, the superimposition image and the region image when being projected being superimposed one over the other.
2. The information processing device according to claim 1, wherein the processing circuitry is configured to, for a pixel in the superimposition region:
generate, based on comparing one of the second display luminance values corresponding to the pixel and a predetermined reference luminance, both
a base-pixel information item of the base image corresponding to the pixel in the superimposition region, and
a superimposition-pixel information item of the superimposition image corresponding to the pixel in the superimposition region.
3. The information processing device according to claim 2, wherein the processing circuitry is configured to, for the pixel in the superimposition region:
when the one of the second display luminance values is lower than the predetermined reference luminance,
generate the base-pixel information item according to the one of the second display luminance values, and
generate the superimposition-pixel information item according to a zero display luminance value.
4. The information processing device according to claim 2, wherein the processing circuitry is configured to, for the pixel in the superimposition region:
when the one of the second display luminance values is higher than the predetermined reference luminance,
generate the base-pixel information item according to the predetermined reference luminance, and
generate the superimposition-pixel information item according to a difference between the one of the second display luminance values and the predetermined reference luminance.
5. The information processing device according to claim 1, wherein the processing circuitry is configured to, for a pixel in the superimposition region:
generate, based on comparing one of the second display luminance values corresponding to the pixel and a first reference luminance or based on comparing the one of the second display luminance values and a second reference luminance that is higher than the first reference luminance,
a base-pixel information item of the base image corresponding to the pixel in the superimposition region, a first superimposition-pixel information item of the superimposition image corresponding to the pixel in the superimposition region, and a second superimposition-pixel information item of a second superimposition image corresponding to the pixel in the superimposition region.

6. The information processing device according to claim 5, wherein the processing circuitry is configured to, for the pixel in the superimposition region:

when the one of the second display luminance values is lower than the first reference luminance, generate the base-pixel information item according to the one of the second display luminance values, and generate the first superimposition-pixel information item and the second superimposition-pixel information item according to a zero display luminance values.

7. The information processing device according to claim 5, wherein the processing circuitry is configured to, for the pixel in the superimposition region:

when the one of the second display luminance values is higher than the first reference luminance and lower than the second reference luminance, generate the base-pixel information item according to the first reference luminance, generate the first superimposition-pixel information item according to a difference between the one of the second display luminance values and the first reference luminance, and generate the second superimposition-pixel information item according to the zero display luminance value.

8. The information processing device according to claim 5, wherein the processing circuitry is configured to, for the pixel in the superimposition region:

when the one of the second display luminance values is higher than the second reference luminance, generate the base-pixel information item according to the first reference luminance, generate the first superimposition-pixel information item according to a difference between the second reference luminance and the first reference luminance, and generate the second superimposition-pixel information item according to a difference between the one of the second display luminance values and the second reference luminance.

9. The information processing device according to claim 2, wherein the predetermined reference luminance is set on a basis of at least one of
a peak luminance of the projection target image,
a displayable luminance of a first image projection device that projects the base image, or
a displayable luminance of a second image projection device that projects the superimposition image.

10. The information processing device according to claim 1, wherein the highlighting process is a process of calculating the second display luminance values in a high dynamic range.

11. The information processing device according to claim 1, wherein the base representation process is a process of calculating the first display luminance values in a standard dynamic range.

12. The information processing device according to claim 1, wherein the processing circuitry is further configured to execute an enlargement process of enlarging the superimposition image in accordance with a resolution of an image projection device that projects the superimposition image.

13. The information processing device according to claim 1, wherein the projection target image is a high dynamic range image.

14. The information processing device according to claim 1, wherein the projection target image includes a plurality of display regions, and the processing circuitry is configured to set at least one of the plurality of display regions as the superimposition region.

15. An information processing method that is carried out by a computer system, the information processing method comprising:

receiving input data of a projection target image;

setting a superimposition region in the projection target image;

performing a base representation process according to a first portion of the input data to calculate first display luminance values in a region of the projection target image other than the superimposition region;

performing a highlighting process according to a second portion of the input data to calculate second display luminance values in the superimposition region;

generating, according to the first display luminance values and the second display luminance values, a base image that contains a region image corresponding to the set superimposition region in the projection target image; and generating, according to the second display luminance values, a superimposition image, the superimposition image and the region image when being projected being superimposed one over the other.

16. A non-transitory storage medium storing a program which, when being executed by a computer, causes the computer to perform:

receiving input data of a projection target image;

setting a superimposition region in the projection target image;

performing a base representation process according to a first portion of the input data to calculate first display luminance values in a region of the projection target image other than the superimposition region;

performing a highlighting process according to a second portion of the input data to calculate second display luminance values in the superimposition region;

generating, according to the first display luminance values and the second display luminance values, a base image that contains a region image corresponding to the set superimposition region in the projection target image; and generating, according to the second display luminance values, a superimposition image the superimposition image and the region image when being projected being superimposed one over the other.

17. The information processing method according to claim 15, wherein, for a pixel in the superimposition region, when one of the second display luminance values corresponding to the pixel is lower than a predetermined reference luminance, a base-pixel information item of the base image corresponding to the pixel in the superimposition region is generated according to the one of the second display luminance values, and a superimposition-pixel information item of the superimposition image corresponding to the pixel in the superimposition region is generated according to a zero display luminance value, and when the one of the second display luminance values is higher than the predetermined reference luminance, the base-pixel information item is generated according to the predetermined reference luminance, and the superimposition-pixel information item is generated according to a difference between the one of the second display luminance values and the predetermined reference luminance.

* * * * *